(12) United States Patent
Hirai

(10) Patent No.: US 9,928,577 B2
(45) Date of Patent: Mar. 27, 2018

(54) IMAGE CORRECTION APPARATUS AND IMAGE CORRECTION METHOD

(71) Applicant: FUJITSU LIMITED, Kawasaki-shi, Kanagawa (JP)

(72) Inventor: Yukio Hirai, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/376,253

(22) Filed: Dec. 12, 2016

(65) Prior Publication Data
US 2017/0206637 A1 Jul. 20, 2017

(30) Foreign Application Priority Data
Jan. 14, 2016 (JP) ................................ 2016-005314

(51) Int. Cl.
G06K 9/40 (2006.01)
G06T 5/00 (2006.01)

(52) U.S. Cl.
CPC .... G06T 5/002 (2013.01); *G06T 2207/10004* (2013.01); *G06T 2207/20024* (2013.01)

(58) Field of Classification Search
CPC ............. G06T 5/002; G06T 5/003; G06T 2207/20192; G06T 2207/20004; G06T 2207/10004; H04N 1/4092; H04N 19/117
USPC ........................................ 382/255, 264, 275
See application file for complete search history.

(56) References Cited

U.S. PATENT DOCUMENTS

| 8,233,706 B2 | 7/2012 | Shimizu et al. |
| 8,248,492 B2 | 8/2012 | Mitsunaga |
| 8,831,372 B2 | 9/2014 | Akiyama |
| 2009/0245679 A1* | 10/2009 | Ohwaki ............... G06T 5/20 382/260 |
| 2010/0290714 A1 | 11/2010 | Toyoda et al. |

FOREIGN PATENT DOCUMENTS

| JP | 2005-051379 | 2/2005 |
| JP | 2009-177558 | 8/2009 |
| JP | 2012-085182 | 4/2012 |
| WO | 2009/101693 | 8/2009 |
| WO | 2009/107197 | 9/2009 |

OTHER PUBLICATIONS

D. J. Jobson et al., "Properties and Performance of a Center/Surround Retinex", IEEE Transactions on Image Processing, vol. 6, No. 3, Mar. 1997, pp. 451-462 (12 pages).

* cited by examiner

*Primary Examiner* — Daniel Mariam
(74) *Attorney, Agent, or Firm* — Fujitsu Patent Center

(57) ABSTRACT

An image correction apparatus generates, for each pixel of a reduced image generated from an input image, a first smoothed image using each reference pixel in a filter area in which a difference obtained by subtracting a luminance value of the pixel from a luminance value of the reference pixel becomes less than a predetermined value, generates a second smoothed image using each reference pixel in the filter area in which the difference obtained by subtracting the luminance value of the reference pixel from the luminance value of the pixel becomes less than the predetermined value, and generates a smoothed image for correction of the input image based on the first smoothed image and the second smoothed image.

11 Claims, 13 Drawing Sheets

1100

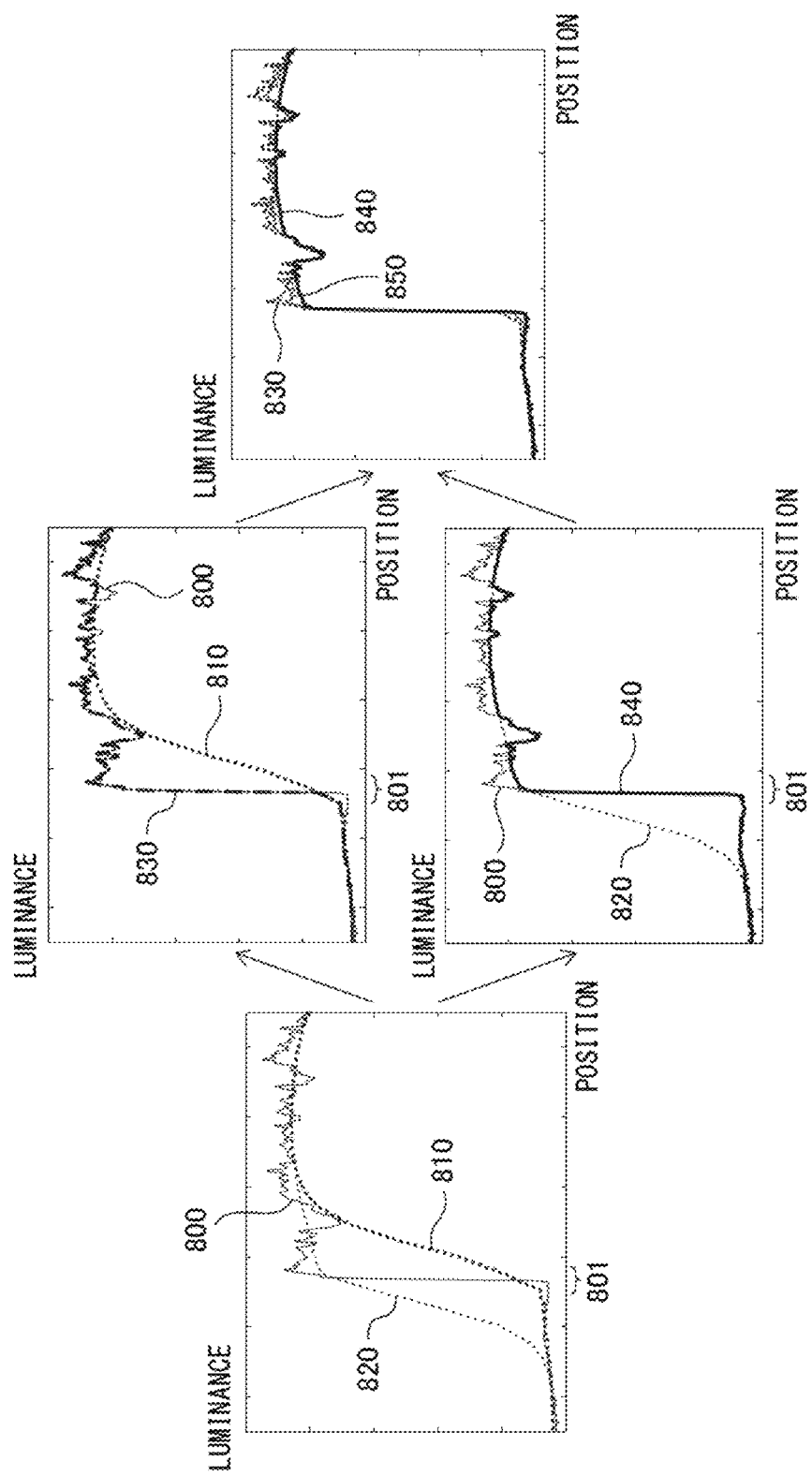

1100

1110

1120

1130

IMAGE CORRECTION APPARATUS AND IMAGE CORRECTION METHOD

CROSS-REFERENCE TO RELATED APPLICATION

This application is based upon and claims the benefit of priority of the prior Japanese Patent Application No. 2016-5314, filed on Jan. 14, 2016, and the entire contents of which are incorporated herein by reference.

FIELD

The embodiments discussed herein are related to an image correction apparatus and an image correction method for correcting the contrast of an object captured in an image.

BACKGROUND

When photographing an object, an object may be partly illuminated and partly shadowed. In such a case, the difference in luminance between the illuminated part of the object and the shadowed part of the object is so significant that it becomes difficult to identify either of the parts. Therefore, there has been proposed a technique in which it is possible to improve the contrast of an object by compressing a dynamic range according to the Retinex theory (for example, refer to D. J. Jobson, et al., "Properties and Performance of a Center/Surround Retinex", IEEE Trans. On Image Processing, Vol. 6, No. 3, March 1997).

The Retinex theory is based on an assumption that the human visual system perceives an object based on a reflectance distribution on the surface of the object which is obtained by eliminating an illuminance distribution of illumination light from a distribution of reflected light from the object rather than the distribution of the reflected light. Thus, in the Retinex theory, it is assumed that the following equation holds:

$$I(x,y)=R(x,y)L(x,y)$$

wherein $I(x,y)$ is a luminance value of a pixel $(x,y)$ of the original image, $R(x,y)$ is a reflectance of an object captured at the pixel $(x,y)$ in the original image, and $L(x,y)$ is an illuminance of illumination light at the pixel $(x,y)$.

In this regard, as the illuminance distribution L of illumination light, for example, a smoothed image is used which is obtained by applying a low-pass filter such as a Gaussian filter to the original image. Further, the reflectance $R(x,y)$ of each pixel is determined, for example, by performing calculation of $R(x,y)=I(x,y)/L(x,y)$, and a corrected image is obtained by multiplying the reflectance $R(x,y)$ of each pixel by a constant k (where k>1).

When the image includes an edge portion in which the illuminance of illumination light changes abruptly, in order to accurately estimate the illuminance distribution L of the illumination light, it is preferable that a smoothing process be performed with respect to the image such that the edge portion is preserved. When the edge portion is not preserved, a discrepancy is caused between the actual illuminance distribution L of the illumination light and the smoothed image in the edge portion, thus an artifact may occur in the corrected image.

Further, in recent years, due to the development of high-definition image sensors, images with a very large number of pixels have been used. Also with videos, moving images in which the number of pixels per frame is large, such as so-called 4 k, are becoming to be used. Therefore, the amount of calculation can preferably be reduced when image correction is performed.

Accordingly, there has been proposed a technique for obtaining, with a small amount of calculation, an illumination light component image in which an artifact does not occur in a gradation correction result (for example, refer to Japanese Laid-open Patent Publication No. 2012-85182). The image processing apparatus disclosed in Japanese Laid-open Patent Publication No. 2012-85182 performs a smoothing process in a state in which an edge is preserved in a reduced image obtained by reducing an input image, and thereby enlarges the resultant image in a state in which the edge is preserved. The image processing apparatus performs, during the enlargement, a filtering process that interpolates pixels and determines a pixel value of an interest pixel, which is a target for the filtering process, based on a weighted addition of pixel values for respective reference pixels. Further, the image processing apparatus sets a weighting factor for the pixel value of each reference pixel based on the difference between the pixel value of the input image corresponding to the interest pixel and the pixel value of each reference pixel and the distance between the interest pixel and each reference pixel after the enlargement.

SUMMARY

The technique disclosed in Japanese Laid-open Patent Publication No. 2012-85182 obtains a smoothed image using a reduced image and thereby reduces the amount of calculation. However, with this technique, in the smoothed image, not only the edge due to a change in the illuminance of illumination light but also a relatively fine edge of an object captured in the image is preserved to some extent. Therefore, the difference between the original image and the smoothed image with respect to the object may become small and thus a sufficient contrast for the reflectance of the object is not obtained, so that the improvement by correction of the contrast of the object becomes insufficient.

According to an embodiment, an image correction apparatus is provided. The image correction apparatus includes a processor configured to:

generate a reduced image which is smaller in number of pixels than an input image;

generate a first smoothed image by setting, for each pixel of the reduced image, a filter area including the pixel and performing smoothing without making reference to each reference pixel, in which a difference obtained by subtracting a luminance value of the pixel from a luminance value of the reference pixel becomes greater than or equal to a first predetermined value, among a plurality of reference pixels included in the filer area and by using a luminance value of each of other reference pixels of the plurality of reference pixels;

generate a second smoothed image by setting the filter area for each pixel of the reduced image and performing smoothing without making reference to each reference pixel, in which the difference obtained by subtracting the luminance value of the reference pixel from the luminance value of the pixel becomes greater than or equal to a second predetermined value, among the plurality of reference pixels included in the filter area and by using the luminance value of each of other reference pixels of the plurality of reference pixels;

generate a smoothed image by calculating, for each pixel of the input image and for each of at least one first pixel of the first smoothed image located surrounding the pixel, a first reference value by making a weight for a higher one of the luminance value of the pixel and the luminance value of the first pixel greater than a weight for other one and performing a weighted addition of the luminance value of the pixel and the luminance value of the first pixel, calculating a second reference value by making a weight for a lower one of a luminance value of a second pixel of the second smoothed image corresponding to the first pixel and the luminance value of the pixel greater than a weight for other one and performing a weighted addition of the luminance value of the pixel and the luminance value of the second pixel, calculating an average of the first reference value and the second reference value as a combined reference value and setting a luminance value obtained by an interpolation using the combined reference value in each of the at least one first pixel as the luminance value of the pixel of the smoothed image corresponding to the pixel of the input image; and generate a corrected image by calculating, for each pixel of the corrected image, the luminance value of the pixel as a value based on a ratio of a luminance value of a corresponding pixel of the input image to a luminance value of a corresponding pixel of the smoothed image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a conceptual diagram of the process by the enlarging/smoothing unit.

DESCRIPTION OF EMBODIMENTS

Figure 1:
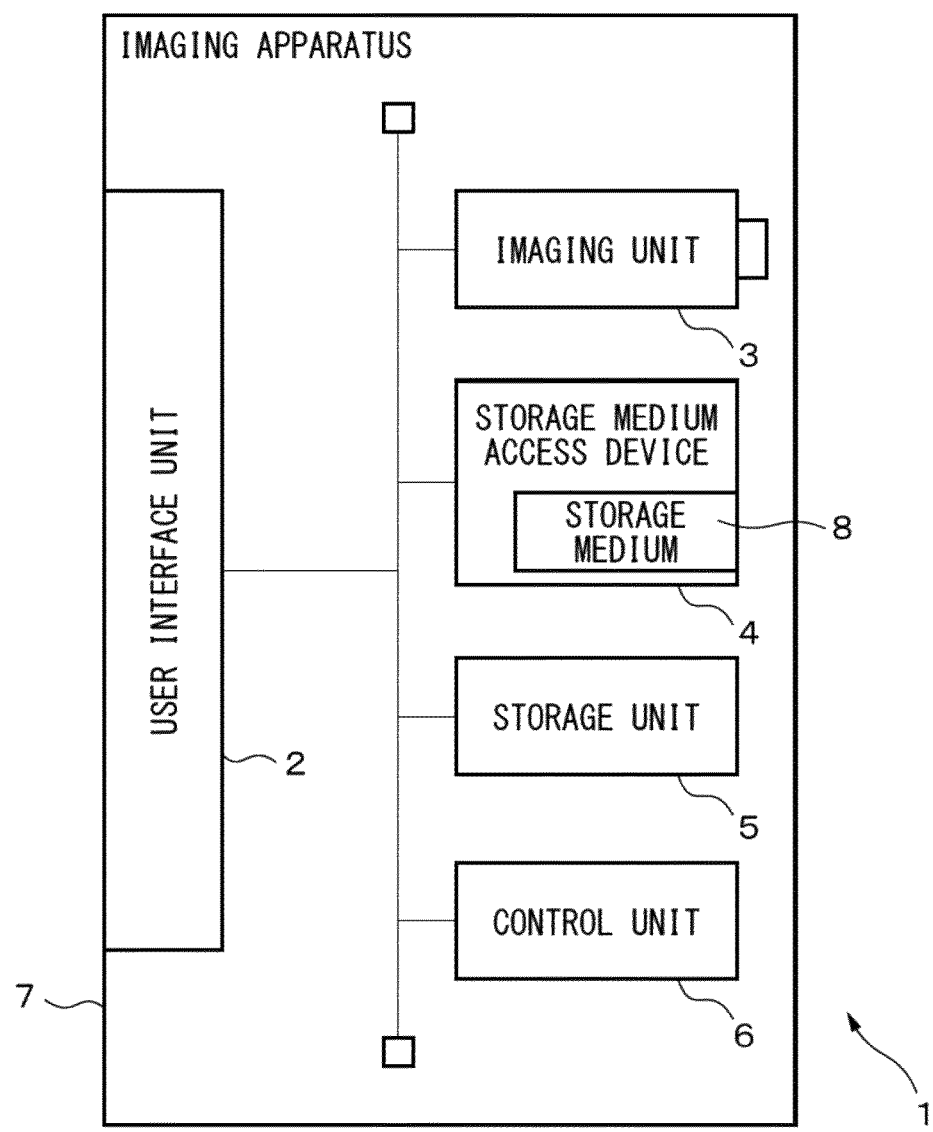
FIG. 1 is a hardware configuration diagram of an imaging apparatus incorporating an image correction apparatus according to an embodiment.

Hereinafter, referring to the drawings, description will be made on an image correction apparatus. The image correction apparatus generates a reduced image by reducing an original image when generating a smoothed image which represents an illuminance distribution of illumination light in the Retinex theory. The image correction apparatus generates a positive-side limiting smoothed image which is smoothed without making reference to a reference pixel, in which a difference obtained by subtracting a luminance value of an interest pixel from a luminance value of the reference pixel is greater than or equal to a predetermined value, among the reference pixels in a filter area for the interest pixel in the reduced image. Further, the image correction apparatus generates a negative-side limiting smoothed image which is smoothed without making reference to the reference pixel, in which the difference obtained by subtracting the luminance value of the reference pixel from the luminance value of the interest pixel is greater than or equal to the predetermined value, among the reference pixels in the filter area. In this manner, the difference between the luminance value of the positive-side limiting smoothed image and the luminance value of the negative-side limiting smoothed image becomes relatively large for the pixel corresponding to the edge of the illuminance distribution of illumination light. Accordingly, the image correction apparatus calculates a first reference value by increasing the weight for one, whose luminance value is higher, of the interest pixel of the original image and a pixel on the surrounding positive-side limiting smoothed image, decreasing the weight for the other one, and performing a weighted addition. Likewise, the image correction apparatus calculates a second reference value by increasing the weight for one whose luminance value is lower of the interest pixel of the original image and a pixel on the surrounding negative-side limiting smoothed image, decreasing the weight for the other one, and performing a weighted addition. Further, the image correction apparatus calculates the luminance value of the corresponding pixel in the smoothed image based on an average value of the first reference value and the second reference value, and thereby obtains a smoothed image in which the fine structure of the object is deteriorated, while preserving the edge of the illuminance distribution of illumination light.

FIG. 1 is a hardware configuration diagram of an imaging apparatus incorporating the image correction apparatus according to an embodiment. An imaging apparatus 1 includes a user interface unit 2, an imaging unit 3, a storage medium access device 4, a storage unit 5, and a control unit 6. The user interface unit 2, the imaging unit 3, the storage medium access device 4, the storage unit 5, and the control unit 6 are disposed in a housing 7. The imaging apparatus 1 may be a cellular phone, a portable information terminal, a digital camera, or a tablet type computer. Further, the imaging apparatus 1 may include a communication interface circuit (not illustrated) for connecting the imaging apparatus 1 to other equipment. It should be noted that FIG. 1 is a view for explaining the components of the imaging apparatus 1 and does not illustrates the actual arrangement of the respective components of the imaging apparatus 1.

The user interface unit 2 includes, for example, a liquid crystal display or an organic electroluminescent display and is disposed in a manner such that the display screen of the user interface unit 2 is directed toward the user who faces the front face of the housing 7. Further, the user interface unit 2 displays to the user various information such as the image generated by the imaging unit 3 or the like. Further, the user interface unit 2 may include a plurality of operation buttons for enabling the user to perform operations with respect to the imaging apparatus 1. Alternatively, the user interface unit 2 may include a touch panel display. In this instance, the user interface unit 2 displays, for example, various icons or operation buttons in accordance with a control signal from the control unit 6. When the user touches the position of the displayed icon or operation button, the user interface unit 2 generates an operation signal corresponding to the position, and outputs the operation signal to the control unit 6.

The imaging unit 3 includes an image sensor including solid-state imaging elements arranged in a two-dimensional array form and an imaging optical system that forms an image of an object on the image sensor.

The imaging unit 3 images an object in response to operation by the user and generates an image in which the object is captured. In the present embodiment, the imaging unit 3 generates a color image represented by an RGB color system. Further, the imaging unit 3 outputs, each time it generates an image, the generated image to the control unit 6.

The storage medium access device 4 is a device that accesses a storage medium 8 such as, for example, a semiconductor memory card. The storage medium access device 4 reads a computer program stored, for example, on the storage medium 8, which to be executed on the control unit 6, and passes it to the control unit 6. Further, as described below, when the control unit 6 executes a computer program that realizes the function as the image correction apparatus, the storage medium access device 4 may read the image-correcting computer program from the storage medium 8 and pass it to the control unit 6.

The storage unit 5 includes, for example, a non-volatile semiconductor memory that is capable of being read and written to and a volatile semiconductor memory that is capable of being read and written to. The storage unit 5 stores various application programs executed on the control unit 6 and various data. Further, the storage unit 5 stores an image to be corrected, a corrected image generated from execution of the image correction process, and various data usable with the image correction process or various data generated in the course of the image correction process.

The control unit 6 includes one or more processors and peripheral circuits thereof. The control unit 6 is connected via a signal line to each unit of the imaging apparatus 1 and controls the entire imaging apparatus 1.

Further, the control unit 6 operates as the image correction apparatus and performs the image correction process with respect to the image received from the imaging unit 3.

Figure 2:
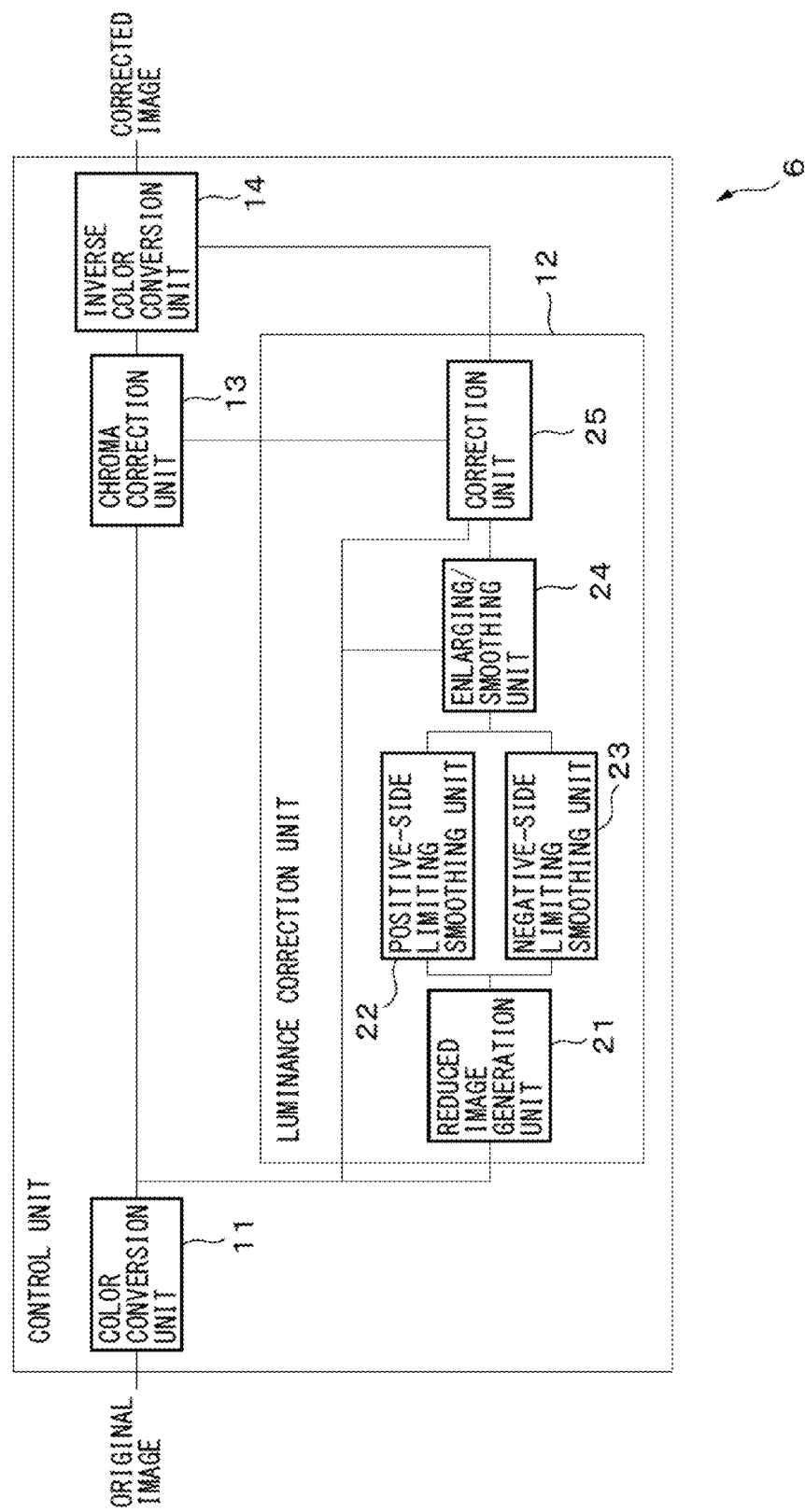
FIG. 2 is a functional block diagram of a control unit related to an image correction process.

FIG. 2 is a functional block diagram of the control unit 6 related to the image correction process. The control unit 6 includes a color conversion unit 11, a luminance correction unit 12, a chroma correction unit 13, and an inverse color conversion unit 14. Further, the luminance correction unit 12 includes a reduced image generation unit 21, a positive-side limiting smoothing unit 22, a negative-side limiting smoothing unit 23, an enlarging/smoothing unit 24, and a correction unit 25. The respective units of the control unit 6 are realized, for example, by a computer program executed on the control unit 6. These respective units of the control unit 6 may be implemented, separately from processors of the control unit 6, in the imaging apparatus 1 as one or more integrated circuits that realize the functions of these respective units.

In the below description, the image to be corrected will be referred to as an original image.

The color conversion unit 11 performs, for each pixel of the original image, a conversion from a value represented by the RGB color system to a value represented by the YUV color system. Further, the color conversion unit 11 outputs a luminance image in which each pixel has only a luminance component (i.e., Y component) among the luminance component and color difference components to the luminance correction unit 12, and outputs a color difference image in which each pixel has only color difference components (i.e., U component and V component) among the luminance component and color difference components to the chroma correction unit 13.

The luminance correction unit 12 corrects the luminance value of each pixel of the luminance image, for example, according to the Retinex theory, and generates a luminance-corrected image. In this manner, the contrast of the object on the luminance-corrected image is emphasized. Then, the luminance correction unit 12 outputs the luminance-corrected image to the inverse color conversion unit 14. Further, the luminance correction unit 12 outputs, for each pixel of the luminance-corrected image, a luminance correction factor γ to the chroma correction unit 13 which is a ratio of the luminance value after the correction to the luminance value of the corresponding pixel of the luminance image before the correction. The details of the process by the luminance correction unit 12 will be described hereinafter.

The chroma correction unit 13 corrects the color difference components of each pixel of the image based on the luminance correction factor γ for the same pixel. For example, the chroma correction unit 13 corrects the color difference components of each pixel of the image in accordance the following equation:

$$U' = \alpha(\gamma)(U-\beta)+\beta$$

$$V' = \alpha(\gamma)(V-\beta)+\beta$$

where U and V are the values for the U and V components before the correction, respectively, and U' and V' are the values for the U and V components after the correction, respectively. β is a constant, and, for example, is set to 128 when the U component and the V component are represented by 0 to 255. α(γ) is a correction factor that is set based on the luminance correction factor γ and may be, for example, a monotonically increasing function which is linear with an increase in the luminance correction factor γ or a monotonically increasing function of which increase rate becomes gentler as the luminance correction factor γ increases, like a sigmoid function.

The chroma correction unit 13 outputs the value of each pixel of the corrected color difference image to the inverse color conversion unit 14.

The inverse color conversion unit 14 converts, for each pixel of the luminance-corrected image, from a value of the YUV color system represented by the luminance value of the pixel and the color difference components of the corresponding pixel of the corrected color difference image to a value represented by the RGB color system. In this manner, a corrected image is obtained.

Hereinafter, description will be made on the details of the luminance correction unit 12.

The reduced image generation unit 21 generates a reduced image with a smaller number of pixels than the number of pixels of the luminance image. For example, the reduced image generation unit 21, in the luminance image, calculates an average of the luminance values for each set of adjacent vertical 2× horizontal 2 pixels, and sets the average as a luminance value of one pixel corresponding to the set. In this manner, an intermediate reduced image is obtained in which the number of pixels is ½ of that of the original luminance image for the vertical direction and the horizontal direction. The reduced image generation unit 21 generates a reduced image by repeating a similar process with respect to the obtained intermediate reduced image by a number of times corresponding to a predetermined reduction ratio (e.g., 1 to 5 times).

Alternatively, the reduced image generation unit 21 may generate a reduced image by sampling pixels from the luminance image at a sampling rate corresponding to the predetermined reduction ratio for the vertical direction and the horizontal direction. The reduction ratio is set, for example, based on the number of pixels in the original image and the arithmetic capacity of the control unit 6, and, for example, is ¼ to ⅟₁₆.

The reduced image generation unit 21 outputs the obtained reduced image to the positive-side limiting smoothing unit 22 and the negative-side limiting smoothing unit 23.

The positive-side limiting smoothing unit 22 performs a smoothing process, for each pixel of the reduced image, through a weighted addition of differences between the luminance value of the pixel and the luminance values of the reference pixels in the filter area including the pixels with weights corresponding to the differences. However, when the difference obtained by subtracting the luminance value of the interest pixel from the luminance value of the reference pixel becomes greater than or equal to a predetermined value, the positive-side limiting smoothing unit 22 decreases the weighting factor for the reference pixel. In other words, a limitation is imposed on reference to the reference pixel in which the difference obtained by subtracting the luminance value of the interest pixel from the luminance value of the reference pixel becomes greater than or equal to the predetermined value. The positive-side limiting smoothing unit 22 performs a positive-side limiting smoothing process, for example, in accordance with the following equation:

$$p'_{x,y} = p_{x,y} + \sum_{i,j \in [-K,K]} \frac{w(p_{x+i,y+j} - p_{x,y})}{N} \quad (1)$$

where $p_{x,y}$ is the luminance value of the pixel (x,y) before correction, and $p'_{x,y}$ is the luminance value of the pixel (x,y) after correction. Further, $p_{x+i,y+j}$ is the luminance value of the reference pixel (x+i,y+j) in the filter area [−K, K]; $w(p_{x+i,y+j}-p_{x,y})$ is the weighting factor set based on $(p_{x+i,y+j}-p_{x,y})$; and N is the number of pixels included in the filter area.

Likewise, the negative-side limiting smoothing unit 23 performs a smoothing process, for each pixel of the reduced image, through a weighted addition of differences between the luminance value of the pixel and the luminance values of the reference pixels in the filter area including the pixel with weights corresponding to the differences. However, when the difference obtained by subtracting the luminance value of the reference pixel from the luminance value of the interest pixel becomes greater than or equal to a predetermined value, the negative-side limiting smoothing unit 23 decreases the weighting factor for the reference pixel. In other words, a limitation is imposed on reference to the reference pixel in which the difference obtained by subtracting the luminance value of the reference pixel from the luminance value of the interest pixel becomes greater than or equal to the predetermined value. The negative-side limiting smoothing unit 23 performs a negative-side limiting smoothing process, for example, in accordance with equation (1) as with the positive-side limiting smoothing process. The filter area set for the negative-side limiting smoothing process is similar to the filter area set for the positive-side limiting smoothing process.

Figure 3:
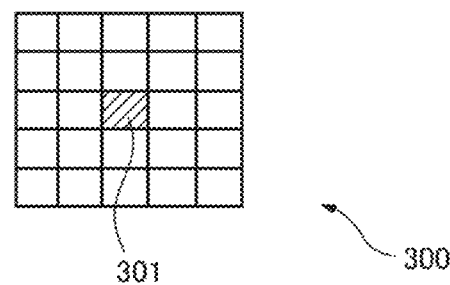
FIG. 3 illustrates an example of a filter area in which a positive-side limiting smoothing process and a negative-side limiting smoothing process are performed.

FIG. 3 illustrates an example of a filter area in which the positive-side limiting smoothing process and the negative-side limiting smoothing process are performed. In this example, when an interest pixel 301 of a reduced image is positive-side limiting smoothed or negative-side limiting smoothed, a filter area 300 with vertical five pixels×horizontal five pixels centered at the interest pixel 301 is set. The luminance values of the twenty-five reference pixels (including the interest pixel 301 per se) in the filter area 300 are referenced.

Figures 4A, 4B:
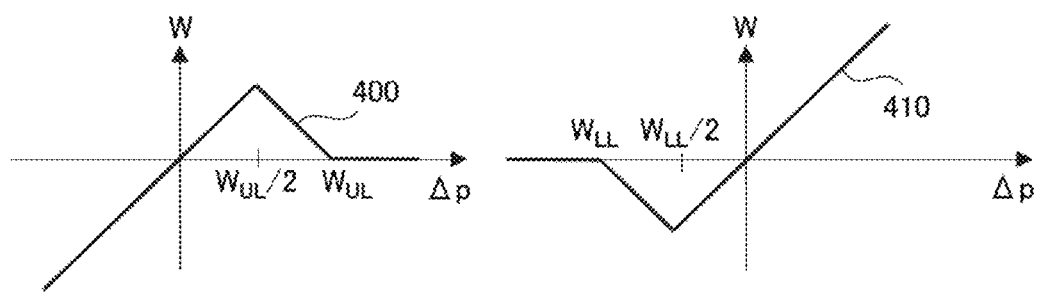
FIG. 4A illustrates an example of the relationship between a difference between a luminance value of a reference pixel and a luminance value of an interest pixel and a weighting factor in the positive-side limiting smoothing process.
FIG. 4B illustrates an example of the relationship between a difference between a luminance value of a reference pixel and a luminance value of an interest pixel and a weighting factor in the negative-side limiting smoothing process.

FIG. 4A illustrates an example of the relationship between a difference between a luminance value of a reference pixel and a luminance value of an interest pixel and a weighting factor in the positive-side limiting smoothing process. In FIG. 4A, the horizontal axis indicates the difference between the luminance value of the reference pixel and the luminance value of the interest pixel, and the vertical axis indicates the weighting factor. A graph 400 represents the relationship between the difference between the luminance for the reference pixel and the luminance value of the interest pixel, $\Delta p$ ($=p_{x+i,y+j}-p_{x,y}$), and the weighting factor w. As represented by the graph 400, when the difference $\Delta p$ is ½ or less of a weight upper limit $W_{UL}$ (where $W_{UL}>0$), the weighting factor w linearly and monotonically increases at a gradient of 1, as the difference $\Delta p$ increases. Thus, it follows that w=$\Delta p$. On the other hand, when the difference $\Delta p$ is greater than ½ of the weight upper limit $W_{UL}$ and smaller than or equal to the weight upper limit $W_{UL}$, the weighting factor w linearly and monotonically decreases at a gradient of −1, as the difference $\Delta p$ increases. Accordingly, it follows that w=($W_{UL}-\Delta p$). Further, when the difference $\Delta p$ becomes greater than the weight upper limit $W_{UL}$, it follows that the weighting factor w=0. When the luminance value is represented by 0 to 255, the weight upper limit $W_{UL}$ is set, for example, to be 10 to 20.

FIG. 4B illustrates an example of the relationship between a difference between a luminance value of a reference pixel and a luminance value of an interest pixel and a weighting factor in the negative-side limiting smoothing process. In FIG. 4B, the horizontal axis indicates the difference between the luminance value of the reference pixel and the luminance value of the interest pixel, and the vertical axis indicates the weighting factor. A graph 410 represents the relationship between the difference between the luminance for the reference pixel and the luminance value of the interest pixel, $\Delta p$ ($=p_{x+i,y+j}-p_{x,y}$), and the weighting factor w. As represented by the graph 410, when the difference $\Delta p$ is greater than or equal to ½ of a weight lower limit $W_{LL}$ (where $W_{LL}<0$), the weighting factor w linearly and monotonically increases at a gradient of 1, as the difference $\Delta p$ increases. Thus, it follows that w=$\Delta p$. When the difference $\Delta p$ is smaller than ½ of the weight lower limit $W_{LL}$ and greater than or equal to the weight lower limit $W_{LL}$, the weighting factor w linearly and monotonically decreases at a gradient of −1, as the difference $\Delta p$ increases. Accordingly, it follows that w=($W_{LL}-\Delta p$). Further, when the difference $\Delta p$ becomes smaller than the weight lower limit $W_{LL}$, it follows that the weighting factor w=0. When the luminance value is represented by 0 to 255, the weight upper limit $W_{LL}$ is set, for example, to be −10 to −20.

Figure 5A:
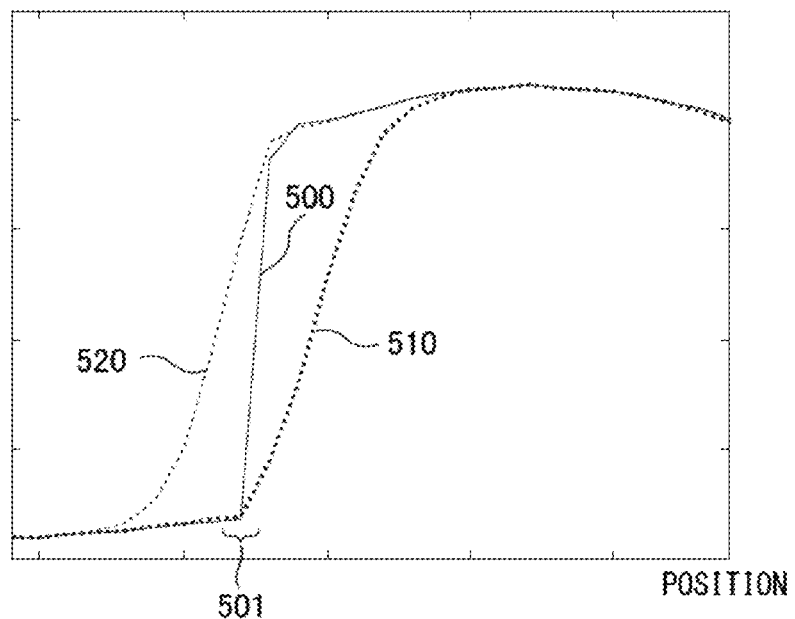
FIG. 5A illustrates an example of the relationship between the original reduced image and a reduced image obtained by applying the positive-side limiting smoothing process and a reduced image obtained by applying the negative-side limiting smoothing process.
Figure 5B:
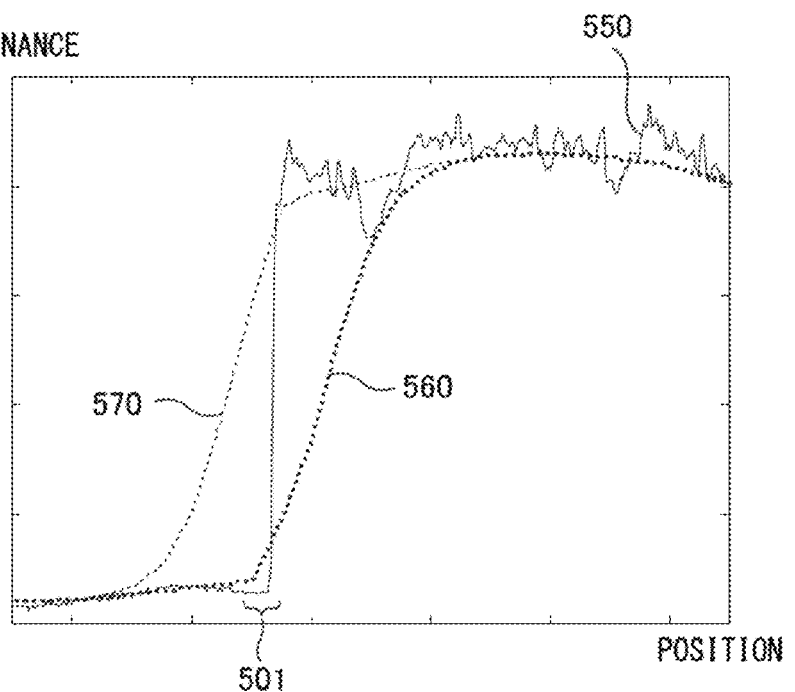
FIG. 5B illustrates an example of the relationship between a luminance image corresponding to the reduced image illustrated in FIG. 5A and interpolated images obtained by bilinear interpolation of the reduced image obtained by applying the positive-side limiting smoothing process and the reduced image obtained by applying the negative-side limiting smoothing process illustrated in FIG. 5A.

FIG. 5A illustrates an example of the relationship between the original reduced image and a reduced image obtained by applying the positive-side limiting smoothing process (hereinafter, referred to for convenience as positive-side limiting smoothed image) and a reduced image obtained by applying the negative-side limiting smoothing process (hereinafter, referred to for convenience as negative-side limiting smoothed image). FIG. 5B illustrates an example of the relationship between a luminance image corresponding to the reduced image illustrated in FIG. 5A and interpolated images obtained by bilinear interpolation of the positive-side limiting smoothed image and the negative-side limiting smoothed image illustrated in FIG. 5A. In FIGS. 5A and 5B, the horizontal axis indicates a horizontal position in the reduced image or the luminance image, and the vertical axis indicates a luminance value. A profile 500 in FIG. 5A represents a profile of luminance values for a horizontal pixel row in the original reduced image. Further, a profile 510 represents a profile of luminance values for the same pixel row as the pixel row represented by the profile 500 in the positive-side limiting smoothed image. A profile 520 represents a profile of luminance values for the same pixel row as the pixel row represented by the profile 500 in the negative-side limiting smoothed image. Further, a profile 550 in FIG. 5B represents a profile of luminance values for a horizontal pixel row corresponding to the pixel row in the reduced image represented by the profile 500 in the luminance image. Likewise, a profile 560 represents a profile of luminance values for a horizontal pixel row in an interpolated image of the positive-side limiting smoothed image corresponding to the horizontal pixel row in the positive-side limiting smoothed image represented by the profile 510. Further, a profile 570 represents a profile of luminance values for a horizontal pixel row in an interpolated image of the negative-side limiting smoothed image corresponding to the pixel row in the negative-side limiting smoothed image represented by the profile 520.

As described above, in the positive-side limiting smoothing process, a limitation is imposed on reference to the reference pixel in which the difference obtained by subtracting the luminance value of the interest pixel from the luminance value of the reference pixel becomes greater than or equal to the predetermined value. Therefore, in positive-side limiting smoothing, the reference pixel having a luminance value lower than the luminance value of the interest pixel is to be referred to rather than the reference pixel having a higher luminance value than the luminance value of the interest pixel. Thus, when an edge portion of the illuminance distribution of illumination light is included in the filter area and the interest pixel is located at a higher luminance side than the edge portion, there is a tendency that the luminance value of the interest pixel smoothed by the positive-side limiting smoothing process becomes lower than the original luminance value. Thus, as represented by the profile 510 and the profile 560, the luminance values for the pixels in the positive-side limiting smoothed image becomes lower than the luminance values for the pixels at the same positions in the original reduced image in the vicinity of the edge portion 501 of the profile 500 and on the higher luminance side than the edge portion 501. At other positions, the luminance values for the pixels in the positive-side limiting smoothed image and the luminance values for the pixels at the same positions in the original reduced image become substantially equal to each other. This is because the difference $\Delta p$ becomes greater than or equal to the weight upper limit and the number of the pixels which are not referenced in the positive-side limiting smoothing process decreases.

In the negative-side limiting smoothing process, a limitation is imposed on reference to the reference pixel in which the difference obtained by subtracting the luminance value of the reference pixel from the luminance value of the interest pixel becomes greater than or equal to the predetermined value. Therefore, the reference pixel having a higher luminance value than the luminance value of the interest pixel is to be referred to rather than the reference pixel having a lower luminance value than the luminance value of the interest pixel in the negative-side limiting smoothing. Thus, when an edge portion of the illuminance distribution of illumination light is included in the filter area and the interest pixel is located at a lower luminance side than the edge portion, there is a tendency that the luminance value of the interest pixel smoothed by the negative-side limiting smoothing process becomes higher than the original luminance value. Thus, as represented by the profile 520 and the profile 570, the luminance values for the pixels in the negative-side limiting smoothed image becomes higher than the luminance values for the pixels at the same positions in the original reduced image in the vicinity of the edge portion 501 and on the lower luminance side than the edge portion 501. At other positions, the luminance values for the pixels in the negative-side limiting smoothed image and the luminance values for the pixels at the same positions in the original reduced image become substantially equal to each other. This is because the difference Δp becomes less than or equal to the weight lower limit and the number of the pixels which are not referenced in the negative-side limiting smoothing process decreases.

Therefore, the higher luminance side than the edge portion of the illuminance distribution of illumination light in the original reduced image is relatively accurately represented in the negative-side limiting smoothed image rather than in the positive-side limiting smoothed image. The lower luminance side than the edge portion in the original reduced image is relatively accurately represented in the positive-side limiting smoothed image rather than in the negative-side limiting smoothed image. In other words, the edge portion is included in a range in which the negative-side limiting smoothed image becomes higher in luminance value than the positive-side limiting smoothed image.

The positive-side limiting smoothing unit 22 outputs the positive-side limiting smoothed image to the enlarging/smoothing unit 24. Further, the negative-side limiting smoothing unit 23 outputs the negative-side limiting smoothed image to the enlarging/smoothing unit 24.

The enlarging/smoothing unit 24 generates an enlarged smoothed image having the same size as the luminance image based on the positive-side limiting smoothed image, the negative-side limiting smoothed image, and the original luminance image.

In the present embodiment, the enlarging/smoothing unit 24 specifies, for each pixel of the positive-side limiting smoothed image and the negative-side limiting smoothed image, corresponding pixels in the original luminance image. For example, it is assumed that for each of the vertical and horizontal directions, the positive-side limiting smoothed image and the negative-side limiting smoothed image are reduced to 1/m (where m is an integer greater than or equal to 2) of the original luminance image. In this case, the enlarging/smoothing unit 24 associates, for example, the pixels at the coordinates (xs, ys) of the positive-side limiting smoothed image and the negative-side limiting smoothed image with the pixel at the coordinates (xs*m+offsetx, ys*m+offsety) of the original luminance image. Wherein, offsetx and offsety are offset values in the horizontal direction and the vertical direction, respectively, and are set, for example, to be 0 or m/2. The enlarging/smoothing unit 24 sequentially renders each pixel of the original luminance image to be an interest pixel and specifies the pixels of the positive-side limiting smoothed image and the negative-side limiting smoothed image at four points around the interest pixel.

Figure 6:
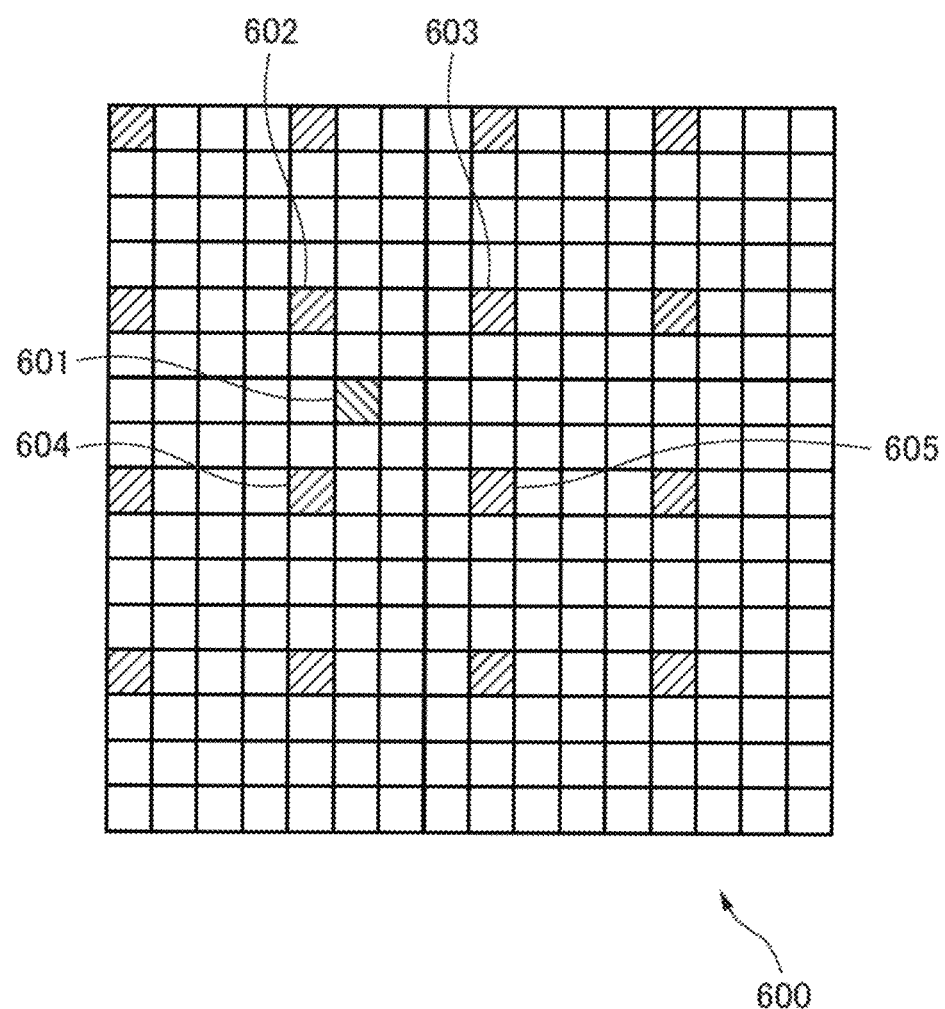
FIG. 6 illustrates an example of the positional relationship between an interest pixel of the luminance image and pixels of a positive-side limiting smoothed image and a negative-side limiting smoothed image which are used to enlarge and smooth the interest pixel.

FIG. 6 illustrates an example of the positional relationship between the interest pixel of the luminance image and pixels of the positive-side limiting smoothed image and the negative-side limiting smoothed image which are used to enlarge and smooth the interest pixel. In this example, the reduction ratio of the reduced image is set to be ¼.

Since the size of each of the positive-side limiting smoothed image and the negative-side limiting smoothed image is the same as the size of the reduced image, the number of pixels of each of the positive-side limiting smoothed image and the negative-side limiting smoothed image is less than the number of pixels of the luminance image. Thus, the respective pixels of the positive-side limiting smoothed image and the negative-side limiting smoothed image are discretely associated with the luminance image 600, and are indicated by hatching in this example. Pixels 602 to 605 of the positive-side limiting smoothed image and the negative-side limiting smoothed image which are the nearest to the interest pixel 601 for each of the top, bottom, left and right directions of the interest pixel 601 are used as the pixels at four points around the interest pixel.

The enlarging/smoothing unit 24 calculates, for each of the surrounding four points, a first reference value which is a combination of the luminance value of the pixel at the point in the positive-side limiting smoothed image and the luminance value of the interest pixel in the original luminance image and a second reference value which is obtained by combining the luminance value of the pixel at the point in the negative-side limiting smoothed image with the luminance value of the interest pixel in the original luminance image. Further, the enlarging/smoothing unit 24 calculates the luminance value of a corresponding pixel in the enlarged smoothed image by performing bilinear interpolation based on a combined reference value obtained by averaging the first reference value and the second reference value for each of the surrounding four points.

As described above, the higher luminance side than the edge of the illuminance distribution of illumination light in the original reduced image is relatively accurately represented in the negative-side limiting smoothed image rather than in the positive-side limiting smoothed image. The lower luminance side than the edge in the original reduced image is relatively accurately represented in the positive-side limiting smoothed image rather than in the negative-side limiting smoothed image. Accordingly, for each of the four points surrounding the interest pixel in the luminance image, the enlarging/smoothing unit 24 makes the weight for the higher one of the luminance value of the pixel in the positive-side limiting smoothed image and the luminance value of the interest pixel greater than the weight for the other one and performs a weighted addition of the two luminance values.

Further, for each of the four points surrounding the interest pixel in the luminance image, the enlarging/smoothing unit 24 makes the weight for the lower one of the luminance value of the pixel in the negative-side limiting smoothed image and the luminance value of the interest pixel greater than the weight for the other one and performs a weighted addition of the two luminance values.

For example, the enlarging/smoothing unit 24 calculates, for each of the four points surrounding the interest pixel of the luminance image, the first reference value $E_{R1}$ and the second reference value $E_{R2}$ in accordance with the following equation:

$$E_{R1} = w_{pl}(E_{pl} - Y) + Y$$

$$E_{R2} = -w_{mi}(E_{mi} - Y) + Y \qquad (2)$$

where Y is the luminance value of the interest pixel, and $E_{pl}$ and $E_{mi}$ are the luminance value of the positive-side limiting smoothed image and the luminance value of the negative-side limiting smoothed image at interest points of the surrounding four points, respectively. Further, $w_{pl}(E_{pl} - Y)$ is a weighting factor determined based on $(E_{pl} - Y)$. Likewise, $w_{mi}(E_{mi} - Y)$ is a weighting factor determined based on $(E_{mi} - Y)$.

Figure 7A:
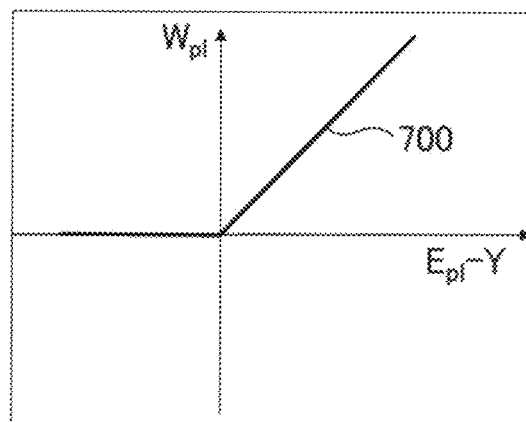
FIG. 7A illustrates an example of a relationship between a difference between a luminance value of the positive-side limiting smoothed image and a luminance value of the interest pixel of the luminance image and a weighting factor.

FIG. 7A illustrates an example of the relationship between the difference ($E_{pl}-Y$) between the luminance value of the positive-side limiting smoothed image and the luminance value of the interest pixel of the luminance image and the weighting factor $w_{pl}(E_{pl}-Y)$. Further, FIG. 7B illustrates an example of the relationship between the difference ($E_{mi}-Y$) between the luminance value of the negative-side limiting smoothed image and the luminance value of the interest pixel of a luminance image and a weighting factor ($w_{mi}(E_{mi}-Y)$).

In FIG. 7A, the horizontal axis indicates the difference ($E_{pl}-Y$) between the luminance value of the positive-side limiting smoothed image and the luminance value of the interest pixel of the luminance image, and the vertical axis indicates the weighting factor $w_{pl}(E_{pl}-Y)$. A graph 700 represents the relationship between the difference ($E_{pl}-Y$) and the weighting factor $w_{pl}(E_{pl}-Y)$. As represented by the graph 700, when the difference ($E_{pl}-Y$) is smaller than or equal to 0, it follows that the weighting factor $w_{pl}(E_{pl}-Y)=0$. Thus, when the difference ($E_{pl}-Y$) is smaller than or equal to 0, i.e., when $Y \geq E_{pl}$, the first reference value $E_{R1}$ becomes Y. When the difference ($E_{pl}-Y$) is greater than 0, i.e., when $E_{pl}>Y$, the gradient of the weighting factor $w_{pl}(E_{pl}-Y)$ with respect to the difference ($E_{pl}-Y$) is 1, and thus the first reference value $E_{R1}$ becomes $E_{pl}$. In other words, the first reference value $E_{R1}$ becomes a value obtained by clipping $E_{pl}$ with Y as the lower limit.

Figure 7B:
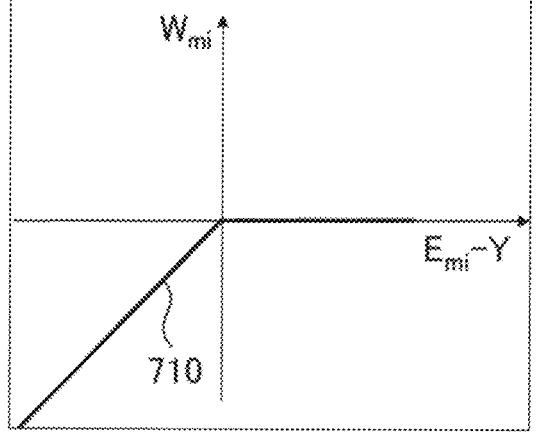
FIG. 7B illustrates an example of a relationship between a difference between a luminance value of the negative-side limiting smoothed image and a luminance value of the interest pixel of the luminance image and a weighting factor.

In FIG. 7B, the horizontal axis indicates the difference ($E_{mi}-Y$) between the luminance value of the negative-side limiting smoothed image and the luminance value of the interest pixel of the luminance image, and the vertical axis indicates the weighting factor $w_{mi}(E_{mi}-Y)$. A graph 710 represents the relationship between the difference ($E_{mi}-Y$) and the weighting factor $w_{mi}(E_{mi}-Y)$. As represented by the graph 710, when the difference ($E_{mi}-Y$) is greater than or equal to 0, it follows that the weighting factor $w_{mi}(E_{mi}-Y)=0$. Thus, when the difference ($E_{mi}-Y$) is greater than or equal to 0, i.e., when $E_{mi} \geq Y$, the second reference value $E_{R2}$ becomes Y. When the difference ($E_{mi}-Y$) is smaller than 0, i.e., when $Y>E_{mi}$, the gradient of the weighting factor $w_{mi}(E_{mi}-Y)$ with respect to the difference ($E_{mi}-Y$) is 1, and thus the second reference value $E_{R2}$ becomes $E_{mi}$. In other words, the second reference value $E_{R2}$ becomes a value obtained by clipping $E_{mi}$ with Y as the upper limit.

FIG. 8 is a conceptual diagram of the process by the enlarging/smoothing unit 24. In each graph, the horizontal axis indicates the position on the luminance image, and the vertical axis indicates the luminance value. In the left side graph, a profile 800 represents a profile of a pixel row in the horizontal direction of the luminance image. Further, profiles 810 and 820 represent a profile in the positive-side limiting smoothed image and a profile in the negative-side limiting smoothed image of the same pixel row, respectively. As described above, an edge portion 801 in the original luminance image is included in a range in which the luminance value of the negative-side limiting smoothed image becomes greater than the luminance value of the positive-side limiting smoothed image.

In the upper side graph at the middle of FIG. 8, a profile 830 represents a profile of the first reference value in the same pixel row as the profile 800 and the profile 810. In the lower side graph at the middle of FIG. 8, a profile 840 represents a profile of the second reference value in the same pixel row as the profile 800 and the profile 820. It can be seen that an edge portion 801 is preserved in both the profile 830 of the first reference value and the profile 840 of the second reference value.

In the right side graph of FIG. 8, a profile 850 represents a profile of the luminance value of the enlarged smoothed image as finally obtained, in the same pixel row as the profile 800, the profile 830, and the profile 840. As represented by the profile 850, it can be seen that the edge portion 801 in the original luminance image is also preserved in the enlarged smoothed image. Further, it can be seen that except for the edge portion 801, the enlarged smoothed image is more smoothed than the original luminance image.

The enlarging/smoothing unit 24 outputs the enlarged smoothed image to the correction unit 25.

The correction unit 25 generates a luminance-corrected image based on the luminance image and the enlarged smoothed image. Since it is considered that the enlarged smoothed image represents the illuminance distribution of illumination light, in the present embodiment, the correction unit 25 calculates the luminance value R(x,y) for each pixel of the luminance-corrected image in accordance with the following equation based on the Retinex theory:

$$R(x, y) = k \times \frac{I(x, y)}{L(x, y)} \qquad (3)$$

where I(x,y) represents the luminance value of the pixel (x,y) of the luminance image, and L(x,y) represents the luminance value of the pixel (x,y) of the enlarged smoothed image. Further, k is an emphasis factor which is set to be a value greater than 1, for example, 2 to 5, and k may not be a constant. For example, k may be defined as a function of I(x,y) such that the smaller I(x,y) is, the greater value k becomes.

The correction unit 25 may calculate $\log(I(x,)/L(x,y))=\log I(x,y)-\log L(x,y)$ instead of I(x,y)/L(x,y) in the equation (3).

Further, the correction unit 25 calculates the correction factor γ for each pixel of the luminance-corrected image.

The correction unit 25 outputs the resultant luminance-corrected image to the inverse color conversion unit 14, and outputs the correction factor γ for each pixel to the chroma correction unit 13.

Figure 9:
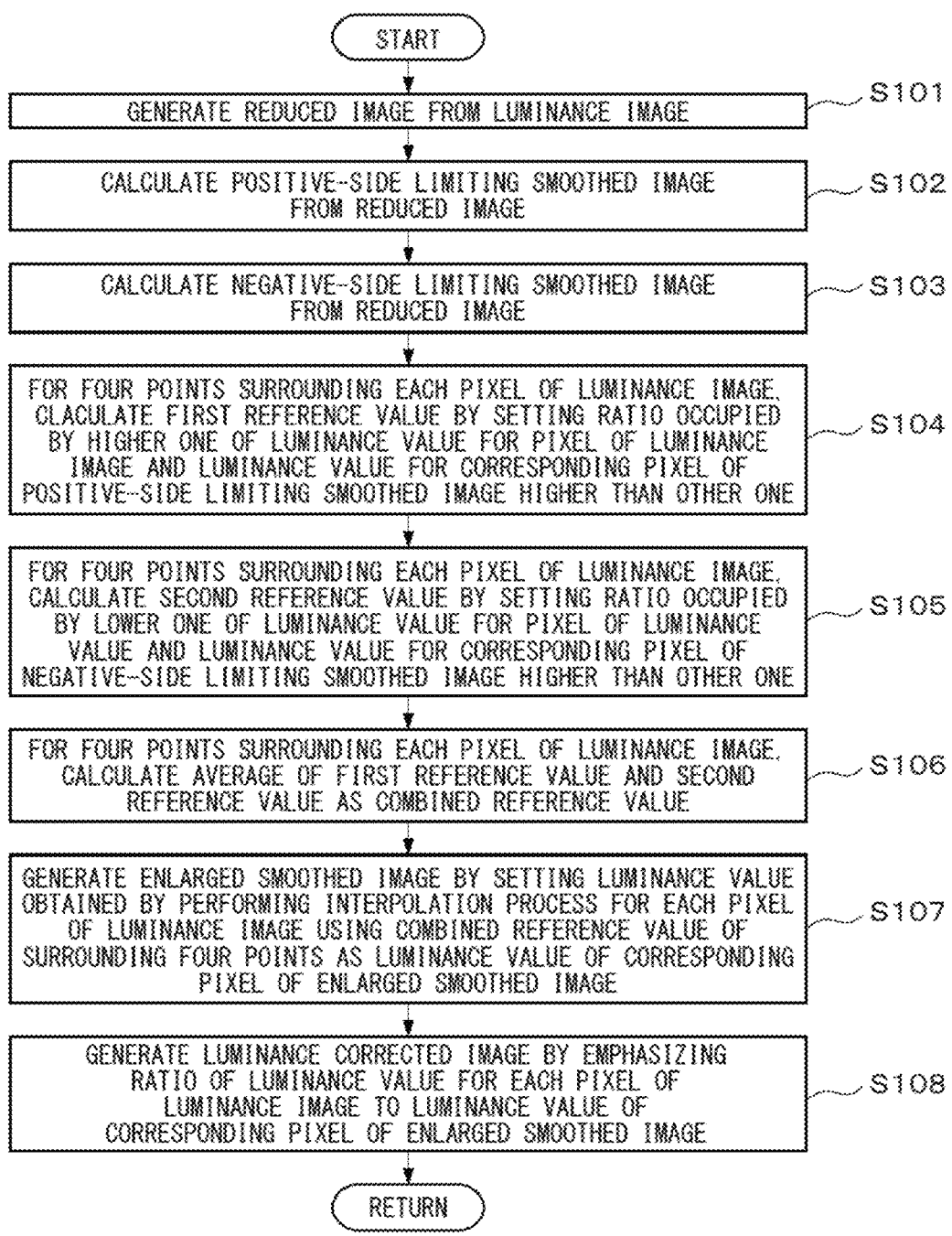
FIG. 9 is an operation flowchart of a luminance correction process.

FIG. 9 is an operation flowchart of the luminance correction process performed by the luminance correction unit 12.

The reduced image generation unit 21 generates a reduced image from the luminance image (step S101).

The positive-side limiting smoothing unit 22 eliminates, for each pixel of the reduced image, the reference pixel, in which the difference obtained by subtracting the luminance value of the pixel from the luminance value of the reference pixel becomes greater than or equal to the predetermined value, among the reference pixels in the filter area. Further, the positive-side limiting smoothing unit 22 calculates, for each pixel of the reduced image, the positive-side limiting smoothed image by performing smoothing using the luminance value of each reference pixel which is not eliminated (step S102). The negative-side limiting smoothing unit 23 eliminates, for each pixel of the reduced image, the reference pixel, in which the difference obtained by subtracting the luminance value of the reference pixel from the luminance value of the pixel becomes greater than or equal to the predetermined value, among the reference pixels in the filter area. Further, the negative-side limiting smoothing unit 23 calculates, for each pixel of the reduced image, the negative-side limiting smoothed image by performing smoothing using the luminance value of each reference pixel which is not eliminated (step S103).

The enlarging/smoothing unit 24 specifies, for each pixel of the original luminance image, the pixels of the positive-side limiting smoothed image and the negative-side limiting smoothed image at the surrounding four points. Then, the enlarging/smoothing unit 24 performs, for each of the surrounding four points, a weighted addition so that the ratio occupied by the higher one of the luminance value of a pixel in the original luminance image and the luminance value of a corresponding pixel in the positive-side limiting smoothed image is greater than that occupied by the other one and thereby calculates the first reference value (step S104). Further, the enlarging/smoothing unit 24 performs, for each of the surrounding four points, an weighted addition so that the ratio occupied by a lower one of the luminance value of a pixel in the original luminance image and the luminance value of a corresponding pixel in the negative-side limiting smoothed image is greater than that occupied by the other one and thereby calculates the second reference value (step S105).

The enlarging/smoothing unit 24 calculates, for each pixel of the original luminance image, an average of the first reference value and the second reference value as a combined reference value of each of the surrounding four points (step S106). Further, the enlarging/smoothing unit 24 generates an enlarged smoothed image by calculating, for each pixel of the original luminance image, a value obtained by performing an interpolation process using the combined reference value of each of the surrounding four points as the luminance value of the corresponding pixel of the enlarged smoothed image (step S107).

The correction unit 25 calculates, for each pixel of the original luminance image, a ratio (I(x,y)/L(x,y)) of the luminance value I(x,y) of the pixel and the luminance value L(x,y) of the corresponding pixel of the enlarged smoothed image, emphasizes the ratio, and thereby generates the luminance-corrected image (step S108). Then, the luminance correction unit 12 completes the luminance correction process.

Figure 10:
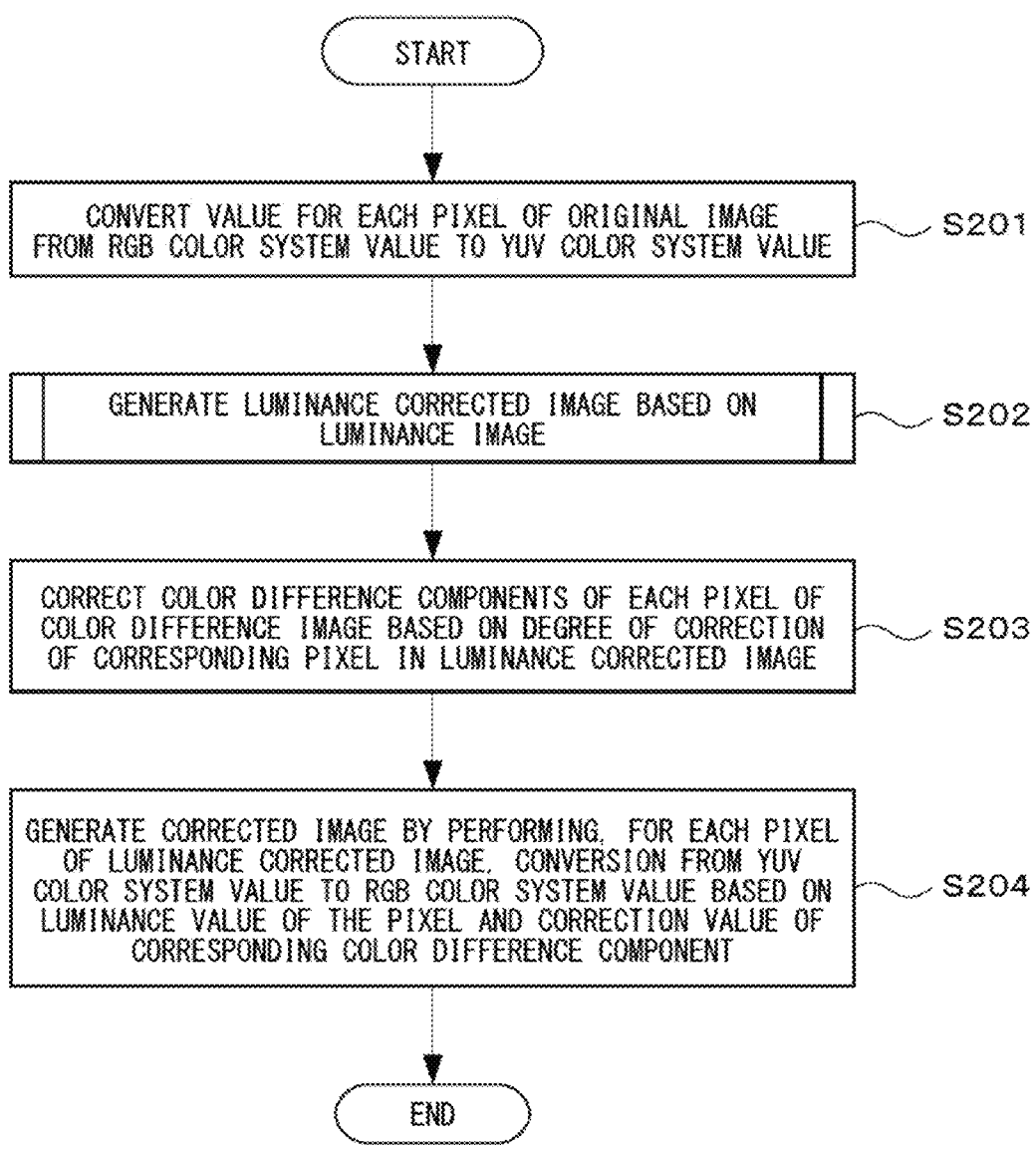
FIG. 10 is an operation flowchart of the image correction process.

FIG. 10 is an operation flowchart of the image correction process performed by the control unit 6.

The color conversion unit 11 performs, for each pixel of the original image, a conversion from an RGB color system value to a YUV color system value (step S201). Further, the color conversion unit 11 outputs a luminance image representing the luminance component for each pixel in the original image to the luminance correction unit 12, and outputs a color difference image representing the color difference component for each pixel in the original image to the chroma correction unit 13.

The luminance correction unit 12 generates, based on the luminance image, a luminance-corrected image in which the contrast of the object is emphasized (step S202). Further, the chroma correction unit 13 corrects the color difference component of each pixel in the color difference image based on the degree of luminance correction in the luminance-corrected image (step S203).

The inverse color conversion unit 14 performs, for each pixel of the luminance-corrected image, a conversion from a YUV color system value represented by the luminance value of the pixel and the color difference component of a corresponding pixel in the corrected color difference image to an RGB color system value, and thereby generates a corrected image (step S204). Then, the control unit 6 completes the image correction process.

Figure 11A:
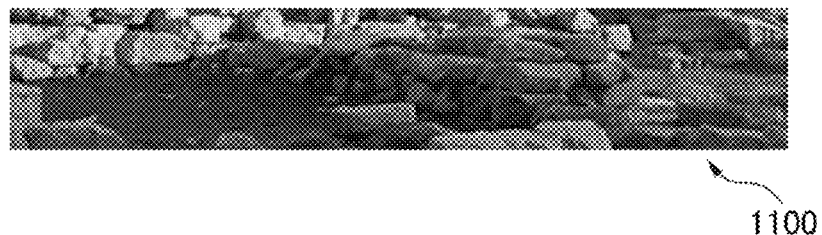
FIG. 11A illustrates an example of the luminance image.
Figure 11B:
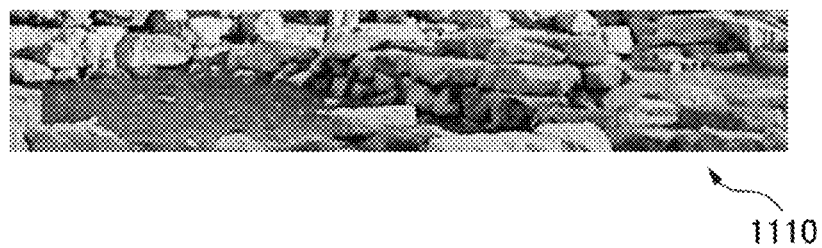
FIG. 11B illustrates, by way of comparative example, an example of a luminance-corrected image when an image obtained by simply enlarging and smoothing the reduced image is used as a smoothed image representing the illuminance distribution of illumination light.
Figure 11C:
FIG. 11C illustrates, by way of another comparative example, an example of a luminance-corrected image when a smoothed image generated by the technique described in Japanese Laid-open Patent Publication No. 2012-85182 is used.
Figure 11D:
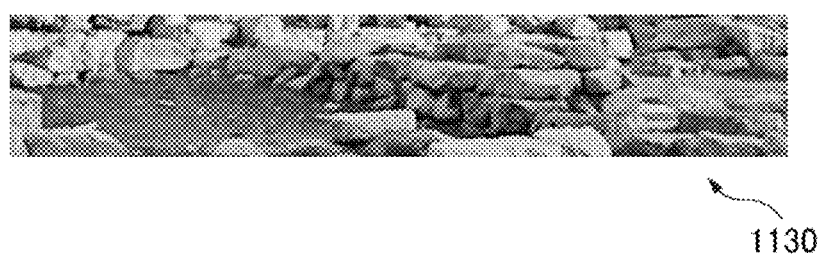
FIG. 11D illustrates an example of a luminance-corrected image according to the present embodiment.

FIG. 11A illustrates an example of the luminance image. FIG. 11B illustrates, by way of comparative example, an example of the luminance-corrected image when an image obtained by simply enlarging and smoothing the reduced image is used as a smoothed image representing the illuminance distribution of illumination light. FIG. 11C illustrates, by way of another comparative example, an example of the luminance-corrected image when a smoothed image generated by the technique described in Japanese Laid-open Patent Publication No. 2012-85182 is used. FIG. 11D illustrates an example of the luminance-corrected image according to the present embodiment.

In the luminance-corrected image 1110 as a comparative example illustrated in FIG. 11B, the border between the shadowed portion and the other portion is excessively emphasized as compared with the luminance image 1100 illustrated in FIG. 11A, and an artifact is produced. In the luminance-corrected image 1120 as another comparative example illustrated in FIG. 11C, the contrast of the object (in this example, a group of rocks) is not substantially improved as compared with the original luminance image 1100. In contrast, in the luminance-corrected image 1130 according to the present embodiment illustrated in FIG. 11D, it can be seen that the artifact at the border between the shadowed portion and the other portion is suppressed and the contrast of the object is enhanced.

As has been described above, the image correction apparatus calculates the positive-side limiting smoothed image in which the luminance value becomes lower than the reduced image on the higher luminance side than the edge of the illuminance distribution of illumination light and the negative-side limiting smoothed image in which the luminance value becomes higher than the reduced image on the lower luminance side than the edge. Further, the image correction apparatus calculates, for each pixel of the luminance image and for each of the surrounding points used for interpolation, the first reference value of which the major component is the higher one of the luminance value of the corresponding pixel of the positive-side limiting smoothed image and the luminance value of the pixel of the luminance image. Likewise, the image correction apparatus calculates the second reference value of which the major component is the lower one of the luminance value of the corresponding pixel of the negative-side limiting smoothed image and the luminance value of the pixel of the luminance image. Further, the image correction apparatus uses, for interpolation, an average of the first reference value and the second reference value of each of the surrounding points, and thus can obtain an enlarged smoothed image in which the fine structure of the object is smoothed while preserving the edge due to the illuminance distribution of illumination light. Hence, the image correction apparatus generates a luminance-corrected image using the enlarged smoothed image, and thus can emphasize the contrast of the object while suppressing occurrence of an artifact in the vicinity of the edge due to the illuminance distribution of the illumination light.

According to a modified example, the enlarging/smoothing unit 24 may be configured such that even when the luminance value Y for the interest pixel of the luminance image is higher than the luminance value $E_{pl}$ of the positive-side limiting smoothed image, the luminance value $E_{pl}$ is included in the first reference value $E_{R1}$ at a lower ratio than the luminance value Y when calculating the first reference value $E_{R1}$. Likewise, the enlarging/smoothing unit 24 may be configured such that even when the luminance value Y for the interest pixel of the luminance image is lower than the luminance value $E_{mi}$ of the negative-side limiting smoothed image, the luminance value $E_{mi}$ is included in the second reference value $E_{R2}$ at a lower ratio than the luminance value Y when calculating the second reference value $E_{R2}$.

Figure 12A:
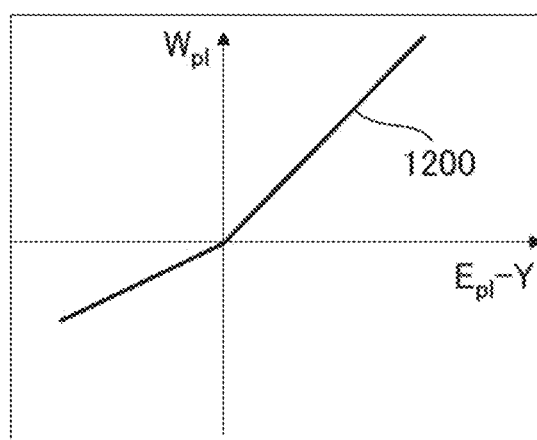
FIG. 12A illustrates an example of the relationship between a difference between a luminance value of a positive-side limiting smoothed image and a luminance value of an interest pixel of a luminance image and a weighting factor according to a modified example.
Figure 12B:
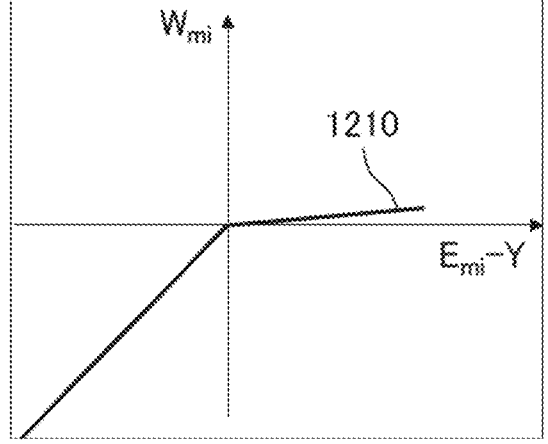
FIG. 12B illustrates an example of the relationship between a difference between a luminance value of a negative-side limiting smoothed image and a luminance value of an interest pixel of a luminance image and a weighting factor according to a modified example.

FIG. 12A illustrates an example of the relationship between the difference ($E_{pl}$-Y) between the luminance value of the positive-side limiting smoothed image and the luminance value of the interest pixel of the luminance image and the weighting factor $w_{pl}(E_{pl}$-Y) according to the modified example. FIG. 12B illustrates an example of the relationship between the difference ($E_{mi}$-Y) between the luminance value of the negative-side limiting smoothed image and the luminance value of the interest pixel of the luminance image and the weighting factor $w_{mi}(E_{mi}$-Y) according to the modified example.

In FIG. 12A, the horizontal axis indicates the difference ($E_{pl}$-Y) between the luminance value of the positive-side limiting smoothed image and the luminance value of the interest pixel of the luminance image, and the vertical axis indicates the weighting factor $w_{pl}(E_{pl}$-Y). Further, a graph 1200 represents the relationship between the difference ($E_{pl}$-Y) and the weighting factor $w_{pl}(E_{pl}$-Y). As represented by the graph 1200, even when the difference ($E_{pl}$-Y) is smaller than or equal to 0, the weighting factor $w_{pl}(E_{pl}$-Y) does not become zero, and the greater the absolute value of the difference, the greater the absolute value of the weighting factor $w_{pl}(E_{pl}$-Y). However, when the difference ($E_{pl}$-Y) is smaller than or equal to 0, the absolute value of the gradient of the weighting factor $w_{pl}(E_{pl}$-Y) with respect to the difference ($E_{pl}$-Y) is less than 1, and thus the ratio occupied by $E_{pl}$ in the first reference value $E_{R1}$ becomes lower than the ratio occupied by Y. When the difference ($E_{pl}$-Y) is greater than 0, the gradient of the weighting factor $w_{pl}(E_{pl}$-Y) with respect to the difference ($E_{pl}$-Y) is 1, and thus the first reference value $E_{R1}$ becomes $E_{pl}$.

In FIG. 12B, the horizontal axis indicates the difference ($E_{mi}$-Y) between the luminance value of the negative-side limiting smoothed image and the luminance value of the interest pixel of the luminance image, and the vertical axis indicates the weighting factor $w_{mi}(E_{mi}$-Y). Further, a graph 1210 represents the relationship between the difference ($E_{mi}$-Y) and the weighting factor $w_{mi}(E_{mi}$-Y). As represented by the graph 1210, even when the difference ($E_{mi}$-Y) is greater than or equal to 0, the weighting factor $w_{mi}(E_{mi}$-Y) does not become 0, and the greater the absolute value of the difference, the greater the absolute value of the weighting factor $w_{mi}$ ($E_{mi}$-Y). However, when the difference ($E_{mi}$-Y) is greater than or equal to 0, the absolute value of the gradient of the weighting factor $w_{mi}$ ($E_{mi}$-Y) with respect to the difference ($E_{mi}$-Y) is less than 1, and thus the ratio occupied by $E_{mi}$ in the second reference value $E_{R2}$ becomes lower than the ratio occupied by Y. When the difference ($E_{mi}$-Y) is smaller than 0, the gradient of the weighting factor $w_{mi}$ ($E_{mi}$-Y) with respect to the difference ($E_{mi}$-Y) is 1, and thus the second reference value $E_{R2}$ becomes $E_{mi}$. In this manner, the ratio occupied by the component of the positive-side limiting smoothed image in the first reference value and the ratio occupied by the component of the negative-side limiting smoothed image in the second reference value become higher than those in the above-described embodiment, so that the enlarged smoothed image is more smoothed. Consequently, the contrast of the object is more emphasized in the luminance-corrected image.

It is preferable that the absolute value of the gradient of the weighting factor $w_{mi}$ ($E_{mi}$-Y) with respect to the difference ($E_{mi}$-Y) when the difference ($E_{mi}$-Y) is greater than or equal to 0 be smaller than the absolute value of the gradient of the weighting factor $w_{pl}(E_{pl}$-Y) with respect to the difference ($E_{pl}$-Y) when the difference ($E_{pl}$-Y) is smaller than or equal to 0. In this manner, on the lower luminance side than the edge of the illuminance distribution of illumination where an artifact is relatively conspicuous, the ratio occupied by the negative-side limiting smoothed image in the enlarged smoothed image is decreased. Thus, according to the modified example, the image correction apparatus can more emphasize the contrast of the object on the higher luminance side than the edge of the illuminance distribution of illumination, while more suppressing occurrence of an artifact on the lower luminance side than the edge of the illuminance distribution of illumination.

As described above, the edge portion of the illuminance distribution of illumination light is included in a range in which the negative-side limiting smoothed image becomes higher in luminance value than the positive-side limiting smoothed image. Therefore, the image correction apparatus can estimate the edge portion of the illuminance distribution of illumination light based on a difference absolute value in luminance between the corresponding pixels of the negative-side limiting smoothed image and the positive-side limiting smoothed image.

Figure 13A:
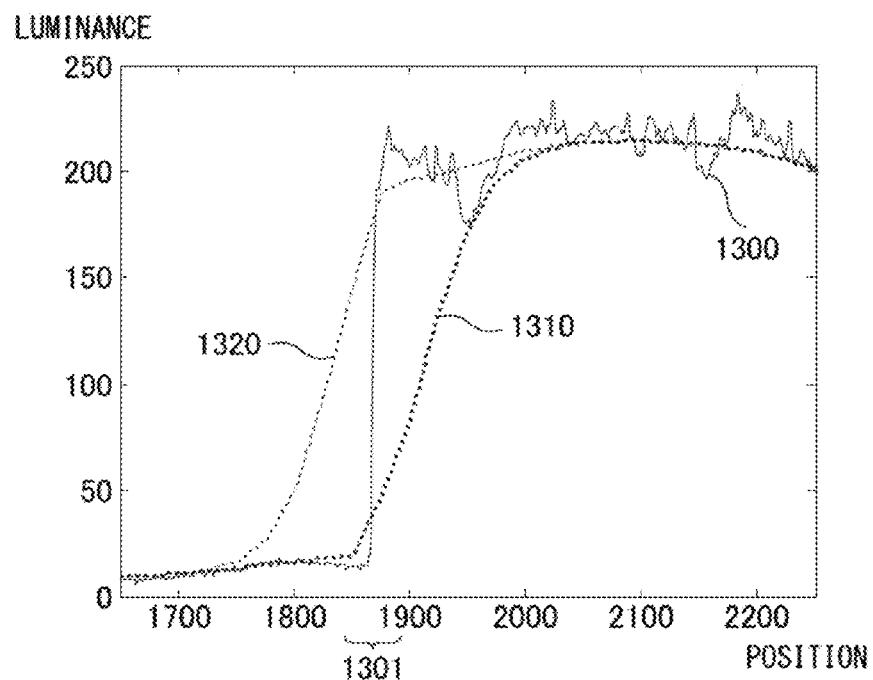
FIG. 13A illustrates an example of the relationship between interpolated images obtained by bilinear interpolation of the positive-side limiting smoothed image and the negative-side limiting smoothed image and the luminance image.
Figure 13B:
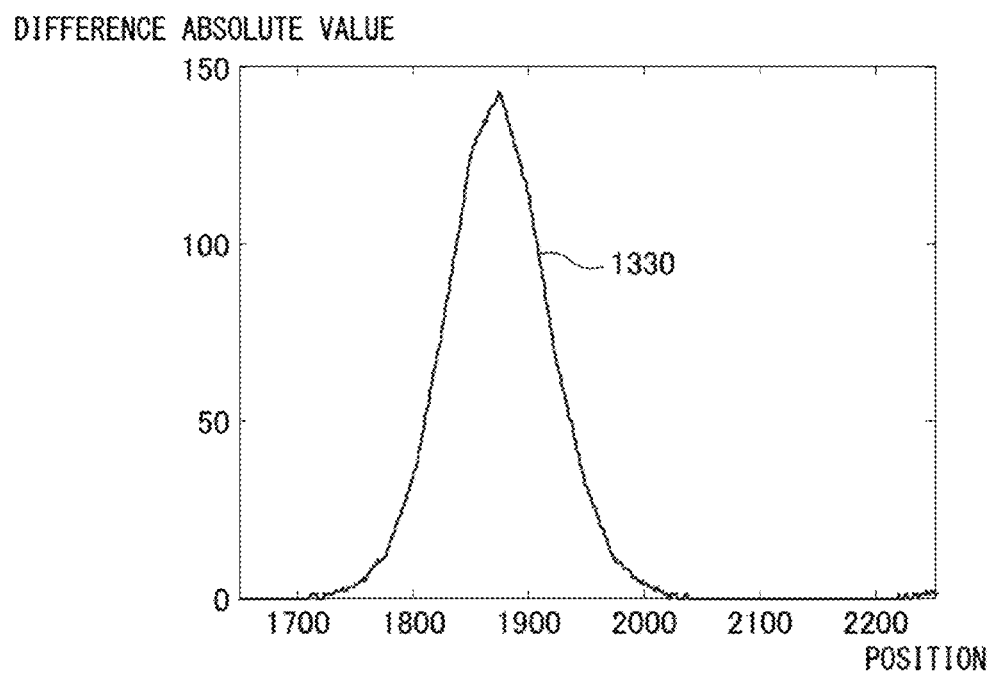
FIG. 13B illustrates an example of a difference absolute value in luminance between corresponding pixels of the interpolated images obtained by bilinear interpolation of the negative-side limiting smoothed image and the positive-side limiting smoothed image.

FIG. 13A illustrates an example of a relationship between interpolated images obtained by bilinear interpolation of the positive-side limiting smoothed image and the negative-side limiting smoothed image and the luminance image, and FIG. 13B illustrates an example of a difference absolute value in luminance between corresponding pixels of the interpolated images obtained by bilinear interpolation of the negative-side limiting smoothed image and the positive-side limiting smoothed image. In FIG. 13A, the horizontal axis indicates the horizontal position in each image, and the vertical axis indicates the luminance value. Further, in FIG. 13B, the horizontal axis indicates the horizontal position in a difference image, and the vertical axis indicates the difference absolute value.

In FIG. 13A, a profile 1300 represents a profile of luminance values for a horizontal pixel row in the luminance image. A profile 1310 represents a profile of luminance values for the same pixel row as the pixel row represented by the profile 1300 in an interpolated image obtained by bilinear interpolation of the positive-side limiting smoothed image. A profile 1320 represents a profile of luminance values for the same pixel row as the pixel row represented by the profile 1300 in an interpolated image obtained by bilinear interpolation of the negative-side limiting smoothed image. Further, in FIG. 13B, a profile 1330 represents a profile of a difference absolute value in luminance between corresponding pixels in interpolated images obtained by bilinear interpolation of the negative-side limiting smoothed image and the positive-side limiting smoothed image for the same pixel row as the pixel row represented by the profile 1300.

As illustrated in FIG. 13A, an edge portion 1301 of the illuminance distribution of illumination light is included in a range in which the negative-side limiting smoothed image becomes higher in luminance value than the positive-side limiting smoothed image. The range coincides with the range in which the difference absolute value becomes relatively great as illustrated in FIG. 13B.

Therefore, according to another modified example, the enlarging/smoothing unit 24 calculates, for each point surrounding the interest pixel of the luminance image, a difference absolute value in luminance between corresponding pixels of the negative-side limiting smoothed image and the positive-side limiting smoothed image. Further, as the difference absolute value increases, the enlarging/smoothing unit 24 increases the ratio occupied by the luminance value of the interest pixel in the first reference value and the second reference value.

The enlarging/smoothing unit 24 specifies, for each pixel of the luminance image and each of the surrounding four points, the corresponding pixels of the negative-side limiting smoothed image and the positive-side limiting smoothed image. Then, the enlarging/smoothing unit 24 calculates, for each of the surrounding four points, a difference absolute value in luminance between the corresponding pixels of the negative-side limiting smoothed image and the positive-side limiting smoothed image. Further, the enlarging/smoothing unit 24 determines, for each of the surrounding four points, a blend ratio between the first reference value $E_{R1}$ and the luminance value of the corresponding pixel of the positive-side limiting smoothed image and a blend ratio between the second reference value $E_{R2}$ and the luminance value of the corresponding pixel of the negative-side limiting smoothed image based on the difference absolute value.

Figure 14:
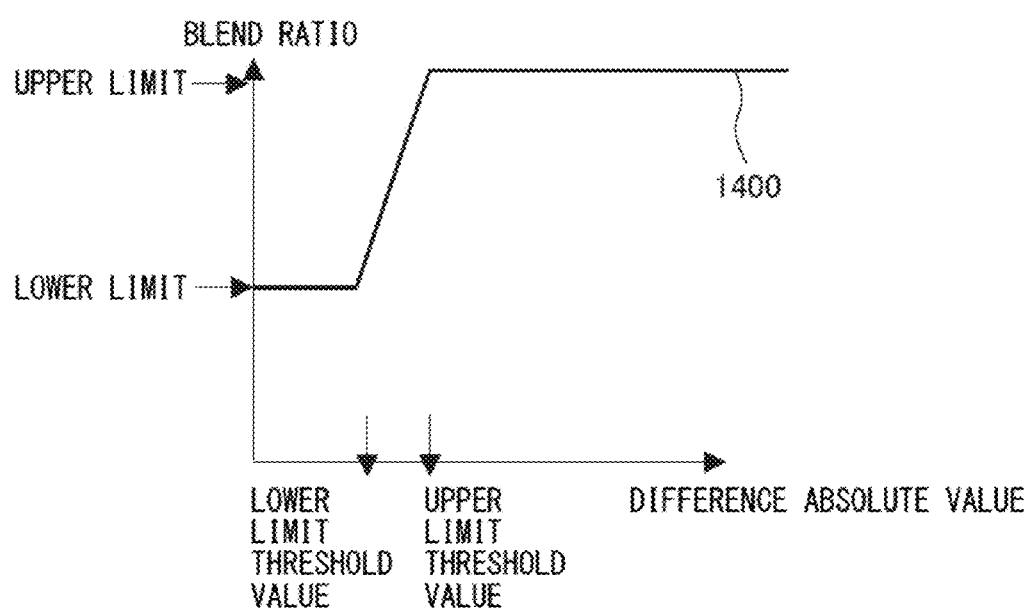
FIG. 14 illustrates an example of a correspondence relationship between the difference absolute value in luminance and a blend ratio.

FIG. 14 illustrates an example of a correspondence relationship between a difference absolute value in luminance and a blend ratio. In FIG. 14, the horizontal axis indicates a difference absolute value in luminance, and the vertical axis indicates a blend ratio of the first reference value $E_{R1}$ to a luminance valued of a pixel of the positive-side limiting smoothed image or a blend ratio of the second reference value $E_{R2}$ to a luminance valued of a pixel of the negative-side limiting smoothed image. A graph 1400 represents the relationship between the difference absolute value in luminance and the blend ratio. As represented by the graph 1400, when the difference absolute value in luminance is higher than or equal to a lower limit threshold value and lower than or equal to an upper limit threshold value, as the difference absolute value in luminance becomes greater, the blend ratio becomes higher. In other words, it becomes more likely that the luminance value of the original luminance image is reflected in the combined reference value. As the difference absolute value in luminance becomes smaller, the blend ratio becomes lower. In other words, it becomes more likely that the luminance value of the positive-side limiting smoothed image or the negative-side limiting smoothed image is reflected in the combined reference value. When the difference absolute value in luminance becomes smaller than the lower limit threshold value, the blend ratio is set to a lower limit value thereof. When the difference absolute value in luminance exceeds the upper limit threshold value, the blend ratio is set to an upper limit value thereof. The lower limit threshold value is, for example, 4, and the upper limit threshold value is, for example, 48. The lower limit value of the blend ratio corresponding to the lower limit threshold value is, for example, 0.5, and the upper limit value of the blend ratio corresponding to the upper limit threshold value is, for example, 1.0.

Upon determination of the blend ratio, the enlarging/smoothing unit 24 blends the first reference value $E_{R1}$ and the luminance value of the corresponding pixel of the positive-side limiting smoothed image together and the second reference value $E_{R2}$ and the luminance value of the corresponding pixel of the negative-side limiting smoothed image together in accordance with the following equation:

$$E'_{R1} = B \times E_{R1} + (1-B) \times E_{pl}$$

$$E'_{R2} = B \times E_{R2} + (1-B) \times E_{mi} \quad (4)$$

where B is the blend ratio, and $E'_{R1}$ and $E'_{R2}$ are the first reference value and the second reference value after the blending, respectively.

The enlarging/smoothing unit 24 sets, for each pixel of the luminance image, an average of the first reference value after the blending and the second reference value after the blending as the combined reference value of each of the surrounding four points. Further, the enlarging/smoothing unit 24 calculates, for each pixel of the luminance image, the luminance value of the corresponding pixel of the enlarged smoothed image by performing bilinear interpolation using the combined reference value at each of the surrounding four points.

According to the modified example, the enlarging/smoothing unit 24 is configured such that in a portion corresponding to the edge of the illuminance distribution of illumination, the luminance value of the original luminance image is more preserved while in the portion other than the edge, more smoothing is performed. As a result, the luminance correction unit 12 can more emphasize the contrast of the object for the portion other than the edge while suppressing occurrence of an artifact in the vicinity of the edge of the illumination light.

According to a further modified example, the enlarging/smoothing unit 24 may calculate a correction value of the luminance for each pixel of the luminance image by other interpolation method such, for example, as nearest-neighbor interpolation or bicubic interpolation. In this instance, the enlarging/smoothing unit 24 may calculate, for each pixel of the luminance image, the first reference value and the second reference value at more than four points.

According to a still further modified example, the control unit 6 may perform the process of the luminance correction unit 12 for each of the red, blue and green components of the input image. Alternatively, the image input to the control unit 6 may be a monochrome image having only the luminance component. In these cases, the color conversion unit 11, the chroma correction unit 13 and the inverse color conversion unit 14 may be omitted. Alternatively, the color conversion unit 11 may convert, for each pixel of the original image, the pixel value to a value represented by a color system other than the YUV color system, e.g., the L*a*b* color system. In this instance, the inverse color conversion unit 14 may also convert each pixel value from the color system value converted by the color conversion unit 11 to the RGB color system value. Alternatively, when each pixel value of the corrected image may be represented by a color system other than the RGB color system, the inverse color conversion unit 14 may be omitted.

The function of each unit of the image correction apparatus according to the above-described embodiment or a modified example thereof may be implemented by a computer program which is executed on a processor. Such a computer program may be provided in a form recorded on a computer-readable recording medium such as a magnetic recording medium, optical recording medium or the like. However, the recording medium does not include a carrier wave.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An image correction apparatus comprising:
a processor configured to:
generate a reduced image which is smaller in number of pixels than an input image;
generate a first smoothed image by setting, for each pixel of the reduced image, a filter area including the pixel and performing smoothing without making reference to each reference pixel, in which a difference obtained by subtracting a luminance value of the pixel from a luminance value of the reference pixel becomes greater than or equal to a first predetermined value, among a plurality of reference pixels included in the filter area and by using a luminance value of each of other reference pixels of the plurality of reference pixels;
generate a second smoothed image by setting the filter area for each pixel of the reduced image and performing smoothing without making reference to each reference pixel, in which the difference obtained by subtracting the luminance value of the reference pixel from the luminance value of the pixel becomes greater than or equal to a second predetermined value, among the plurality of reference pixels included in the filter area and by using the luminance value of each of other reference pixels of the plurality of reference pixels;
generate a smoothed image by calculating, for each pixel of the input image and for each of at least one first pixel of the first smoothed image located surrounding the pixel, a first reference value by making a weight for a higher one of the luminance value of the pixel and the luminance value of the first pixel greater than a weight for other one and performing a weighted addition of the luminance value of the pixel and the luminance value of the first pixel, calculating a second reference value by making a weight for a lower one of a luminance value of a second pixel of the second smoothed image corresponding to the first pixel and the luminance value of the pixel greater than a weight for other one and performing a weighted addition of the luminance value of the pixel and the luminance value of the second pixel, calculating an average of the first reference value and the second reference value as a combined reference value and setting a luminance value obtained by an interpolation using the combined reference value in each of the at least one first pixel as the luminance value of the pixel of the smoothed image corresponding to the pixel of the input image; and
generate a corrected image by calculating, for each pixel of the corrected image, the luminance value of the pixel as a value based on a ratio of a luminance value of a corresponding pixel of the input image to a luminance value of a corresponding pixel of the smoothed image.

2. The image correction apparatus according to claim 1, wherein calculation of the first reference value and the second reference value comprises: for each pixel of the input image and for each of the at least one first pixel, setting the luminance value of the pixel as the first reference value when the luminance value of the pixel is higher than the luminance value of the first pixel, and setting the luminance value of the pixel as the second reference value when the luminance value of the pixel is lower than the luminance value of the second pixel corresponding to the first pixel.

3. The image correction apparatus according to claim 1, wherein calculation of the first reference value and the second reference value comprises: for each pixel of the input image and for each of the at least one first pixel, calculating the first reference value such that when the luminance value of the pixel is higher than the luminance value of the first pixel, a first ratio occupied by the luminance value of the pixel in the first reference value is higher than a ratio occupied by the luminance value of the first pixel in the first reference value; and calculating the second reference value such that when the luminance value of the pixel is lower than the luminance value of the second pixel corresponding to the first pixel, a second ratio occupied by the luminance value of the pixel in the second reference value is higher than a ratio occupied by the luminance value of the second pixel in the second reference value.

4. The image correction apparatus according to claim 3, wherein the first ratio is higher than the second ratio.

5. The image correction apparatus according to claim 1, wherein calculation of the first reference value and the second reference value comprises: for each pixel of the input image and for each of the at least one first pixel, calculating a difference absolute value between the luminance value of the first pixel and the luminance value of the corresponding second pixel; as the difference absolute value increases, increasing a ratio occupied by the luminance value of the pixel in the first reference value, and increasing a ratio occupied by the luminance value of the pixel in the second reference value.

6. An image correction method comprising:
generating a reduced image which is smaller in number of pixels than an input image;
generating a first smoothed image by setting, for each pixel of the reduced image, a filter area including the pixel and performing smoothing without making reference to each reference pixel, in which a difference obtained by subtracting a luminance value of the pixel from a luminance value of the reference pixel becomes greater than or equal to a first predetermined value, among a plurality of reference pixels included in the filter area and by using a luminance value of each of other reference pixels of the plurality of reference pixels;
generating a second smoothed image by setting the filter area for each pixel of the reduced image and performing smoothing without making reference to each reference pixel, in which the difference obtained by subtracting the luminance value of the reference pixel from the luminance value of the pixel becomes greater than or equal to a second predetermined value, among the plurality of reference pixels included in the filter area and by using the luminance value of each of other reference pixels of the plurality of reference pixels;
generating a smoothed image by calculating, for each pixel of the input image and for each of at least one first pixel of the first smoothed image located surrounding the pixel, a first reference value by making a weight for a higher one of the luminance value of the pixel and the luminance value of the first pixel greater than a weight for other one and performing a weighted addition of the luminance value of the pixel and the luminance value of the first pixel, calculating a second reference value by making a weight for a lower one of a luminance value of a second pixel of the second smoothed image corresponding to the first pixel and the luminance value of the pixel greater than a weight for other one and performing a weighted addition of the luminance value of the pixel and the luminance value of the second pixel, calculating an average of the first reference value and the second reference value as a combined reference value and setting a luminance value obtained by an interpolation using the combined reference value in each of the at least one first pixel as the luminance value of the pixel of the smoothed image corresponding to the pixel of the input image; and generating a corrected image by calculating, for each pixel of the corrected image, the luminance value of the pixel as a value based on a ratio of a luminance value of a corresponding pixel of the input image to a luminance value of a corresponding pixel of the smoothed image.

7. The image correction method according to claim 6, wherein calculation of the first reference value and the second reference value comprises: for each pixel of the input image and for each of the at least one first pixel, setting the luminance value of the pixel as the first reference value when the luminance value of the pixel is higher than the luminance value of the first pixel, and setting the luminance value of the pixel as the second reference value when the luminance value of the pixel is lower than the luminance value of the second pixel corresponding to the first pixel.

8. The image correction method according to claim 6, wherein calculation of the first reference value and the second reference value comprises: for each pixel of the input image and for each of the at least one first pixel, calculating the first reference value such that when the luminance value of the pixel is higher than the luminance value of the first pixel, a first ratio occupied by the luminance value of the pixel in the first reference value is higher than a ratio occupied by the luminance value of the first pixel in the first reference value; and calculating the second reference value such that when the luminance value of the pixel is lower than the luminance value of the second pixel corresponding to the first pixel, a second ratio occupied by the luminance value of the pixel in the second reference value is higher than a ratio occupied by the luminance value of the second pixel in the second reference value.

9. The image correction method according to claim 8, wherein the first ratio is higher than the second ratio.

10. The image correction method according to claim 6, wherein calculation of the first reference value and the second reference value comprises: for each pixel of the input image and for each of the at least one first pixel, calculating a difference absolute value between the luminance value of the first pixel and the luminance value of the corresponding second pixel; as the difference absolute value increases, increasing a ratio occupied by the luminance value of the pixel in the first reference value, and increasing a ratio occupied by the luminance value of the pixel in the second reference value.

11. A non-transitory computer-readable recording medium having recorded thereon a computer program for image correction that causes a computer to execute a process comprising:

generating a reduced image which is smaller in number of pixels than an input image;

generating a first smoothed image by setting, for each pixel of the reduced image, a filter area including the pixel and performing smoothing without making reference to each reference pixel, in which a difference obtained by subtracting a luminance value of the pixel from a luminance value of the reference pixel becomes greater than or equal to a first predetermined value, among a plurality of reference pixels included in the filter area and by using a luminance value of each of other reference pixels of the plurality of reference pixels;

generating a second smoothed image by setting the filter area for each pixel of the reduced image and performing smoothing without making reference to each reference pixel, in which the difference obtained by subtracting the luminance value of the reference pixel from the luminance value of the pixel becomes greater than or equal to a second predetermined value, among the plurality of reference pixels included in the filter area and by using the luminance value of each of other reference pixels of the plurality of reference pixels;

generating a smoothed image by calculating, for each pixel of the input image and for each of at least one first pixel of the first smoothed image located surrounding the pixel, a first reference value by making a weight for a higher one of the luminance value of the pixel and the luminance value of the first pixel greater than a weight for other one and performing a weighted addition of the luminance value of the pixel and the luminance value of the first pixel, calculating a second reference value by making a weight for a lower one of a luminance value of a second pixel of the second smoothed image corresponding to the first pixel and the luminance value of the pixel greater than a weight for other one and performing a weighted addition of the luminance value of the pixel and the luminance value of the second pixel, calculating an average of the first reference value and the second reference value as a combined reference value and setting a luminance value obtained by an interpolation using the combined reference value in each of the at least one first pixel as the luminance value of the pixel of the smoothed image corresponding to the pixel of the input image; and generating a corrected image by calculating, for each pixel of the corrected image, the luminance value of the pixel as a value based on a ratio of a luminance value of a corresponding pixel of the input image to a luminance value of a corresponding pixel of the smoothed image.

* * * * *